United States Patent
Volpe et al.

(10) Patent No.: US 10,810,133 B1
(45) Date of Patent: Oct. 20, 2020

(54) ADDRESS TRANSLATION AND ADDRESS TRANSLATION MEMORY FOR STORAGE CLASS MEMORY

(71) Applicant: Amazon Technologies, Inc., Seattle, WA (US)

(72) Inventors: Thomas A. Volpe, Austin, TX (US); Steven Scott Larson, Georgetown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/814,303

(22) Filed: Nov. 15, 2017

(51) Int. Cl.
G06F 12/00 (2006.01)
G06F 12/1027 (2016.01)
G06F 12/1009 (2016.01)
G06F 12/123 (2016.01)
G06F 12/128 (2016.01)

(52) U.S. Cl.
CPC ...... G06F 12/1027 (2013.01); G06F 12/1009 (2013.01); G06F 12/123 (2013.01); G06F 12/128 (2013.01); G06F 2212/621 (2013.01); G06F 2212/65 (2013.01); G06F 2212/68 (2013.01)

(58) Field of Classification Search
CPC ... G06F 12/1018; G06F 12/10; G06F 12/0261
See application file for complete search history.

(56) References Cited

U.S. PATENT DOCUMENTS

| 5,201,039 | A  | 4/1993  | Sakamura       |
| 5,680,568 | A  | 10/1997 | Sakamura       |
| 7,711,923 | B2 | 5/2010  | Rogers et al.  |
| 7,991,944 | B2 | 8/2011  | Lee et al.     |
| 9,400,749 | B1 | 7/2016  | Kuzmin et al.  |
| 9,792,219 | B2 | 10/2017 | Rao            |
| 2006/0031710 | A1 | 2/2006 | Jo            |

(Continued)

OTHER PUBLICATIONS

U.S. Appl. No. 15/814,300, filed Nov. 15, 2017, Titled: Address Translation for Storage Class Memory in a System That Includes Virtual Machines.

(Continued)

Primary Examiner — Baboucarr Faal
(74) Attorney, Agent, or Firm — Kilpatrick Townsend & Stockton LLP

(57) ABSTRACT

Provided are systems and methods for an address translation circuit for a memory controller. In various implementations, the address translation circuit includes an address translation table operable to include a subset of address translations for a processor memory. An address translation memory can include all address translations for the processor memory. The address translation circuit can be operable to receive an input address for a transaction to processor memory. The address translation circuit can determine an index for the address translation table by inputting the input address into a hash function. The address translation circuit can read a row from the address translation table using the index. The address translation circuit can determine whether an entry in the row includes an address translation for the input address. The address translation can generate and output a translated address using the address translation.

22 Claims, 12 Drawing Sheets

(56) References Cited

U.S. PATENT DOCUMENTS

| | | | |
|---|---|---|---|
| 2006/0179212 A1 | 8/2006 | Kim et al. | |
| 2007/0294490 A1* | 12/2007 | Freitas | G06F 12/0246 |
| | | | 711/154 |
| 2008/0177974 A1 | 7/2008 | Chiang et al. | |
| 2013/0013889 A1 | 1/2013 | Devaraj et al. | |
| 2013/0246757 A1 | 9/2013 | Bradbury et al. | |
| 2016/0147669 A1* | 5/2016 | Huang | G06F 12/0864 |
| | | | 711/128 |
| 2016/0182373 A1* | 6/2016 | Wang | H04L 45/7453 |
| | | | 370/392 |
| 2017/0060706 A1* | 3/2017 | Kinoshita | G06F 11/1666 |
| 2018/0060071 A1 | 3/2018 | Nassi et al. | |
| 2018/0189062 A1 | 7/2018 | Baghsorkhi et al. | |
| 2018/0306839 A1 | 10/2018 | Donnal et al. | |
| 2018/0351692 A1* | 12/2018 | Rozenboim | H04L 1/0018 |
| 2019/0340123 A1 | 11/2019 | Herdrich et al. | |

OTHER PUBLICATIONS

U.S. Appl. No. 15/814,306, filed Nov. 15, 2017, Titled: Page Table Search Engine.

* cited by examiner

ADDRESS TRANSLATION AND ADDRESS TRANSLATION MEMORY FOR STORAGE CLASS MEMORY

BACKGROUND

Storage class memory is a type of persistent memory that uses technologies such as resistive Random Access Memory (RAM), Phase Change Memory, Magnetic RAM, Ferroelectric RAM, or flash-based memory cells, among other technologies. Storage class memory can have read performance that is comparable to Dynamic Random Access Memory (DRAM) and write performance that is significantly faster than technologies used for hard drives. Storage class memory can thus be used for processor memory, in place of or in addition to DRAM and RAM-based technologies, which have been the primary technologies used for processor memory.

Similar to flash-based memory, storage class memory can suffer from wear: the gradual breakdown of the storage cells until the storage cells are no longer able to reliably store data. To manage the wear, a server system can include a memory controller that can execute wear leveling operations. Wear leveling can include, for a same address, determining to write the data for the address to different blocks at different times. Wear leveling can also include moving data from worn out blocks to blocks that are more reliable, and vice versa.

BRIEF DESCRIPTION OF THE DRAWINGS

Various embodiments in accordance with the present disclosure will be described with reference to the drawings, in which.

DETAILED DESCRIPTION

Figure 1:
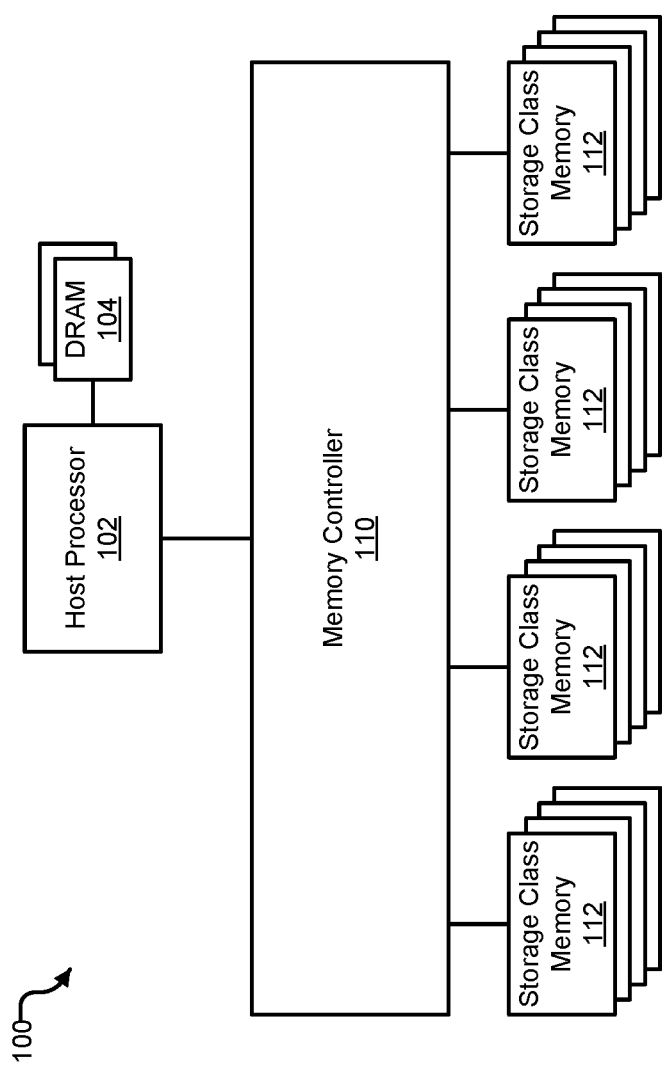
FIG. 1 illustrates an example of a processor architecture that includes a large amount of processor memory.

In the following description, various example implementations will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Server designs can require that the server's processor have access to large amounts of processor memory. Processor memory is the memory that is most local to the processor, and which the processor uses for data that the processor is acting on or will immediately act on. For example, the processor memory is where executing parts of an operating system can be stored, as well as the code for currently executing applications. In contrast, storage memory, such as disk drives, can be used by the processor to store data that the processor is not currently acting on. Most often, the processor memory is accessible to the processor over a host bus that is directly connected to the processor. Processor memory can also be referred to as main memory.

Server processors can have many cores, executing many individual execution threads. For example, a server processor can have 64 or more cores, executing a total of 128 or more threads. To support these cores and execution threads, the processor needs large amounts of processor memory, enough so that applications executing on the processor do not experience noticeable lag (e.g., noticeable to a user of the applications) due to data needing to be moved between processor memory and storage memory.

Dynamic Random Access Memory (DRAM) and variations of DRAM are often used for processor memory because DRAM can provide a relatively high capacity for a relatively low cost. Using DRAM, a server can be equipped with on the order of 256 gigabytes (GB) to 512 GB or more of processor memory, for example.

There are some limitations to DRAM, however. For example, the amount of memory that can be included in a single physical DRAM chip may be limited to the degree to which the DRAM storage cells can be shrunk. At some point, the limitations of physics and the ability to store or move electrons between molecules will become an obstacle. As another example, there are practical limitations to the number of DRAM modules that can be put into a server system. Assuming, for example, that a DRAM module is one half inch wide and six inches long, sixteen DRAM module could require a board space that is eight inches wide and six inches long. In this example, increasing the amount of DRAM can lead to issues with routing signals between the DRAM and the processor, having to increase the size of the board to accommodate more DRAM modules, having to increase the size chassis to fit the larger boards and accompanying DRAM, cooling issues, and possible other issues.

One solution for increasing the memory that is available to a processor is to store data in storage memory, such as solid state drives and other hard drives. Accessing storage memory can be relatively slow, however, thus a processor will store data in storage memory that the processor does not have an immediate need for. Additionally, to reduce the negative effect of storage memory latency, a processor will execute a block operation to storage, where a set of multiple, sequential addresses are read or written in the same operations.

Other memory storage technologies are thus being used to extend the amount of processor memory that is available to a processor. One such technology is storage class memory. Storage class memory (SCM) uses persistent memory technologies such as resistive RAM, Phase Change Memory, Magnetic RAM, Ferroelectric RAM, or flash-based memory cells, among other technologies. Storage class memory can have read performance similar to DRAM and write performance that is significantly faster than technologies used for hard drives. For example, a solid state drive can require on the order of 0.1 milliseconds (ms) to read, while storage class memory can require 300-500 nanoseconds (ns) to read. The speed of storage class memory brings such memory into the range of speed of DRAM, enabling load-store operations (the moving of data from memory to a processor's registers) as well as block operations. Storage class memory can also be much denser than DRAM. For example, a single DRAM module can have on the order of 64 GB of memory capacity, while a single storage class memory module can have on the order of 2 terabytes (TB) of memory capacity.

Storage class memory, however, does have limitations. For example, some types of storage class memory technologies "wears" over time, and loses the ability to store data. Repeated program cycles (e.g., writing of data to a memory cell) can eventually cause the physical structure of the transistors that make up the memory to break down and lose the ability to store data. For example, some flash technologies can withstand a million or more program cycles before becoming unreliable.

To extend the life of storage class memory, a memory controller for the storage class memory can include wear leveling. Wear leveling attempts to arrange data so that erasures and re-writes are distributed evenly across available memory. Distributing erasures and re-writes can reduce the possibility that a single block should fail due to undergoing a high concentration of program cycles. Wear leveling can include dynamic wear leveling, in which each time data is re-written to the memory, the data is written to a new location. Wear leveling can also include static wear leveling, where static blocks that do not change are periodically moved so that the cells occupied by the static blocks can be used by other data.

In addition to tasks such as wear leveling, a memory controller for storage class memory can assist in making storage class memory usable as processor memory. For example, the memory controller can manage the multiples of terabytes of address space that can be provided by storage class memory in an efficient manner, so that neither the processor nor software needs to be occupied making sure that the memory is being used well. As a further example, the memory controller can manage write failures that can occur with storage class memory, can provide memory address security, data encryption, memory usage statistics, and can hide wear leveling activities from the processor, so that the processor can use storage class memory in the same or similar manner as DRAM.

One issue raised by wear leveling is that the memory controller may determine to write the same data to different addresses at different times, or to move data that is in a block of storage class memory that is becoming unreliable. As a result, data that the processor assumes is at one address may be at different addresses in memory at different times. For example, the processor can issue a write to address 0x12340000 (hexadecimal), which the memory controller could write to address 0x12340000. But when the processor later issues a read to 0x12340000, expecting to find the data that was previously written, the data may now be located at address 0x56780000.

To hide wear leveling activities, the memory controller can include an address translation mechanism, in the form of an address translation circuit. In various implementations, the address translation circuit can include an address translation table that can store translations between addresses from the processor (which will be referred to herein as processor addresses or machine physical addresses) and addresses that can be used to read storage class memory (which will be referred to herein as processor memory addresses or memory physical addresses). The address translation table can store recently used address translations, and the memory controller can further include a dedicated address translation memory, which can store a page table with additional address translations. To help ensure optimal performance, the address translation memory can include a translation for all possible addresses in the address space provided by the storage class memory.

The address translation circuit can also provide service optimization for virtual machines executing on a server system. For example, a part of the address translation table can be reserved for each possible virtual machine identifier, so that each virtual machine is guaranteed a space in the address translation table. A part of the address translation table can also be available to any virtual machine, so that particular active virtual machines can use more than the space allotted to them. Other optimizations can include, for example, the ability to lock an entry for a particular machine physical address and the ability to designate an entry as eligible to be evicted should an entry for a new translation be needed.

While the following description discusses address translation for processor memory constructed using storage class memory, the address translation mechanisms discussed below can be used for memory that uses other technology, including, for example, solid state memory and DRAM.

FIG. 1 illustrates an example of a processor architecture 100 that includes a large amount of processor memory. In the illustrated example, the processor memory includes a small amount of DRAM 104 and many ranks of storage class memory 112. In other examples, other types of memory can be used in place of or in addition to storage class memory, such as more DRAM, synchronous dynamic random access memory (SDRAM), double data rate SDRAM (DDR SDRAM), DDR2, DDR3, and/or solid state memory, among other types of memory.

In the illustrated processor 102 can be a multi-core, multi-threaded processor. The processor 102 can have an address space, a part of which includes the DRAM 104 and a part of which includes the storage class memory 112. In some examples, another part of the address space of the processor can be mapped to Input/Output (I/O devices). A 64-bit processor can theoretically have an address space that includes 9,223 quadrillion individually addressable bytes, though in practice a fraction of the available address space is actually used.

The processor 102 can use the DRAM 104 for extremely latency sensitive operations, and/or for operations where the memory controller 110 may not be available. For example, code for initializing the memory controller can be stored in the DRAM 104. In some examples, the DRAM 104 can include one or more DRAM modules each having one or more ranks, wherein each rank can be one or more physical chips on a card. Each module can have, for example 64 GB of memory space. In other examples, other types of memory can be used in place of DRAM, such as SRAM.

In various implementations, the memory controller 110 can manage multiple ranks of storage class memory 112. A set of ranks can have, for example, 2 TB of memory space. In some implementations, the ranks of storage class memory 112 can be grouped into different memory channels, which can be individually managed by the memory controller 110. In the illustrated example, the storage class memory 112 has been organized into four memory channels. In other examples, the processor architecture 100 can include fewer or more memory channels.

In various implementations, the memory controller 110 can include one or more communication channels for communicating with the processor 102. The multiple processor communication channels can enable multiple processor cores and/or multiple threads to issue transactions to the memory controller 110 in parallel. In some cases, the processor communication channels can implement a same bus protocol or different bus protocols. Examples of bus protocols that can be used for the processor communication channel include Peripheral Component Interconnect Express (PCIe) and Intel UltraPath Interconnect (UPI). Read and write transactions from the processor 102 can have, for example, 64-bit addresses.

In various implementations, the memory controller 110 is a single integrated circuit or a combination of integrated circuits. The memory controller 110 can be implemented in, for example, an Application Specific Integrated Circuit (ASIC), a Field Programmable Gate Array (FPGA), or a System-on-a-Chip (SoC). In some implementations, the memory controller 110 can reside on a separate card that can be installed on a motherboard that includes the processor 102. In some implementations, the memory controller 110 can be installed on the same board as the processor. In some implementations, the memory controller 110 can be part of the same integrated circuit as the processor 102.

Figure 2:
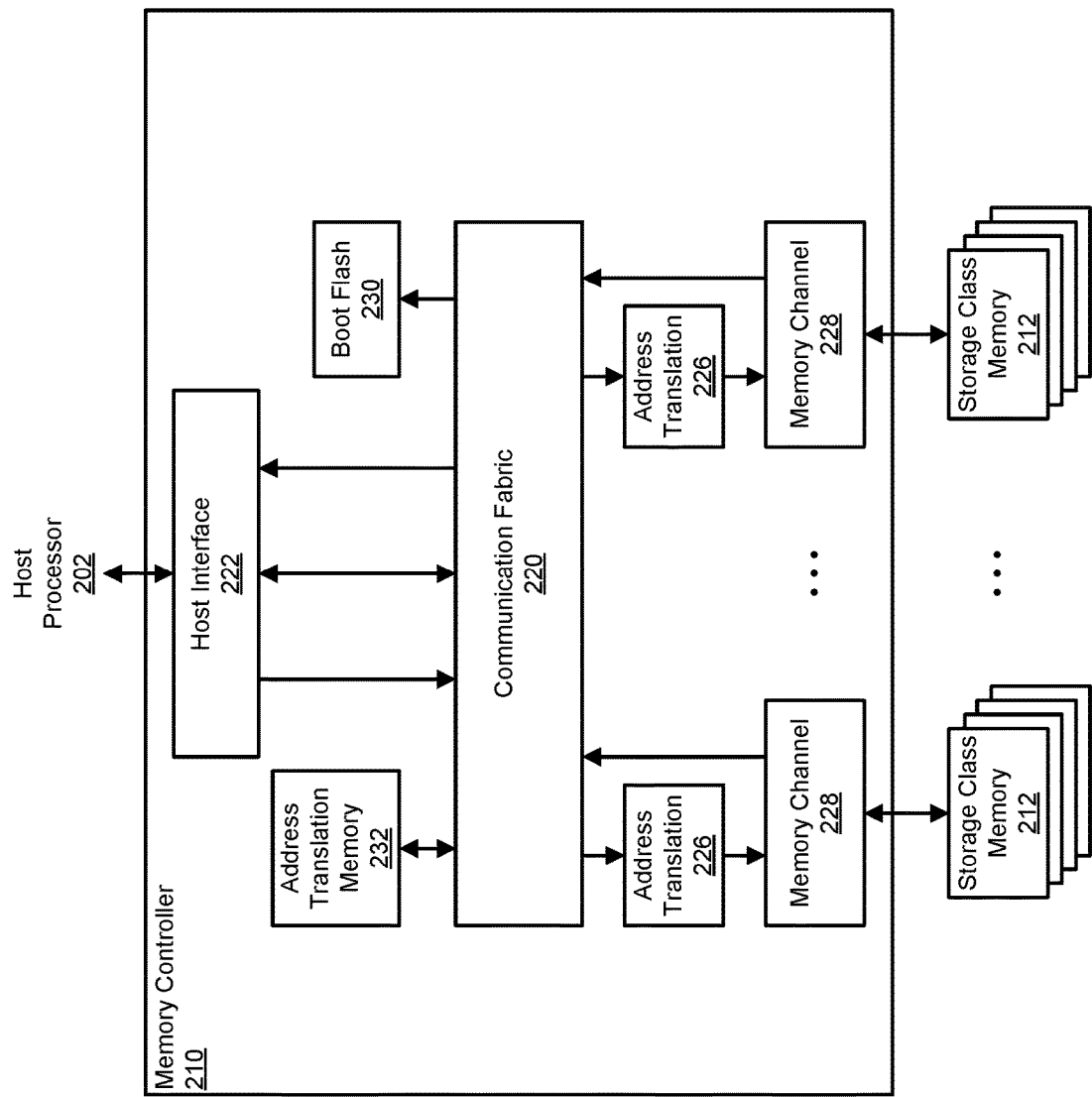
FIG. 2 illustrates an example of a memory controller that can be used in the processor architecture illustrated in FIG. 1.

FIG. 2 illustrates an example of a memory controller 210 that can be used in the processor architecture 100 illustrated in FIG. 1. As illustrated by the example of FIG. 2, the memory controller 210 can include a host interface 222 for communicating with a host processor 202. As noted above, the host interface 222 can include multiple communication channels (which can be referred to as links) with the host processor 202. The memory controller 210 can further include a communication fabric 220 through which internal components of the memory controller 210 can communicate. The communication fabric 220 can be implemented using a standardized protocol such as Advanced Extensible Interface (AXI) or a variation of AXI, or a proprietary protocol. The memory controller 210 can further include one or more memory channels 228, through which the memory controller 210 can communicate with ranks of storage class memory 212. In various implementations, the memory controller 210 can also include a boot flash 230, a flash memory that can store information such as code for any microcontrollers in the memory controller 210. In some implementations the boot flash 230 is part of the memory controller 210. In some implementations, the boot flash 230 is a memory that is external to the memory controller, and is accessed using a flash interface. In examples where the memory controller 210 is implemented as an FPGA, the boot flash 230 can alternatively or additionally include the FPGA image for the memory controller 210.

In various implementations, the memory controller 210 can include an address translation 226 circuit. As noted above, the memory controller 210, in managing the storage class memory 212, may determine, independently of any instructions from the host processor 202, where data should be written to, or that data should be moved from one part of the storage class memory 212 to another. Specifically, the memory channels 228 can include, for example, a microcontroller circuit that executes wear leveling operations and other memory management operations. When a memory channel 228 determines a memory physical address at which data should be stored or to which data should be moved, it would be possible for the memory channel 228 to inform the host processor 202 of the memory physical address. But doing so would be disruptive to the operation of the processor. For example, the data may be part of code that is being executed, and any other code that is referring to address at which the data is located would have to be updated by the processor to refer to the new address. Such operations may not even be possible without modifying the operating system executing on the processor.

To avoid having to burden the host processor 202 with updates related to the management of the storage class memory 212, the memory controller 210 can use the address translation 226 circuit to hide the exact memory physical address of data in the storage class memory 212. As discussed further below, the address translation 226 can translate an address for a memory transaction from the address used by the host processor 202 (e.g., a machine physical address) to the address where the memory channel 228 has placed the data or will place the data (e.g., a memory physical address). The host processor 202 can thus use the storage class memory 212 as more processor memory: the processor does not need to determine where to write data to, and can assume that data written to a particular address can be read from the same address, even if the data has been moved.

The address translation 226 circuit is conceptually similar to an address translation cache, which is often referred to as a translation lookaside buffer (TLB). A TLB stores translations between virtual memory (e.g., the memory that is represented to the processor as available processor memory) and physical memory, specifically storing translations that were recently used by a processor. A TLB can, for example, make processor memory appear much larger than the physical processor memory of the system, with the additional memory being provided by storage memory.

A memory management unit for the processor can work together with the TLB. The memory management unit can divide memory, both virtual and physical, into fixed-length, contiguous blocks, called pages. Managing pages can be simpler than managing each individual virtual and physical address. A page in virtual memory, referred to as a logical page, maps to a page in physical memory, referred to as a physical page. A physical page can be either in processor memory or on disk. The memory management unit can maintain a list of the physical pages presently in processor memory, where the list is referred to as a page table.

When a virtual-to-physical address translation is not present in the TLB (a condition referred to as a TLB miss), the memory management unit can check whether a virtual-to-physical page translation is present in the page table. When a virtual-to-physical page translation is not present in the page table (a condition referred to as a page fault), the processor is informed. The processor can then search physical memory for the physical page. Once the physical page is located, the data from the physical page can be loaded into processor memory, the page table can be updated, and the TLB can be updated.

Figure 4:
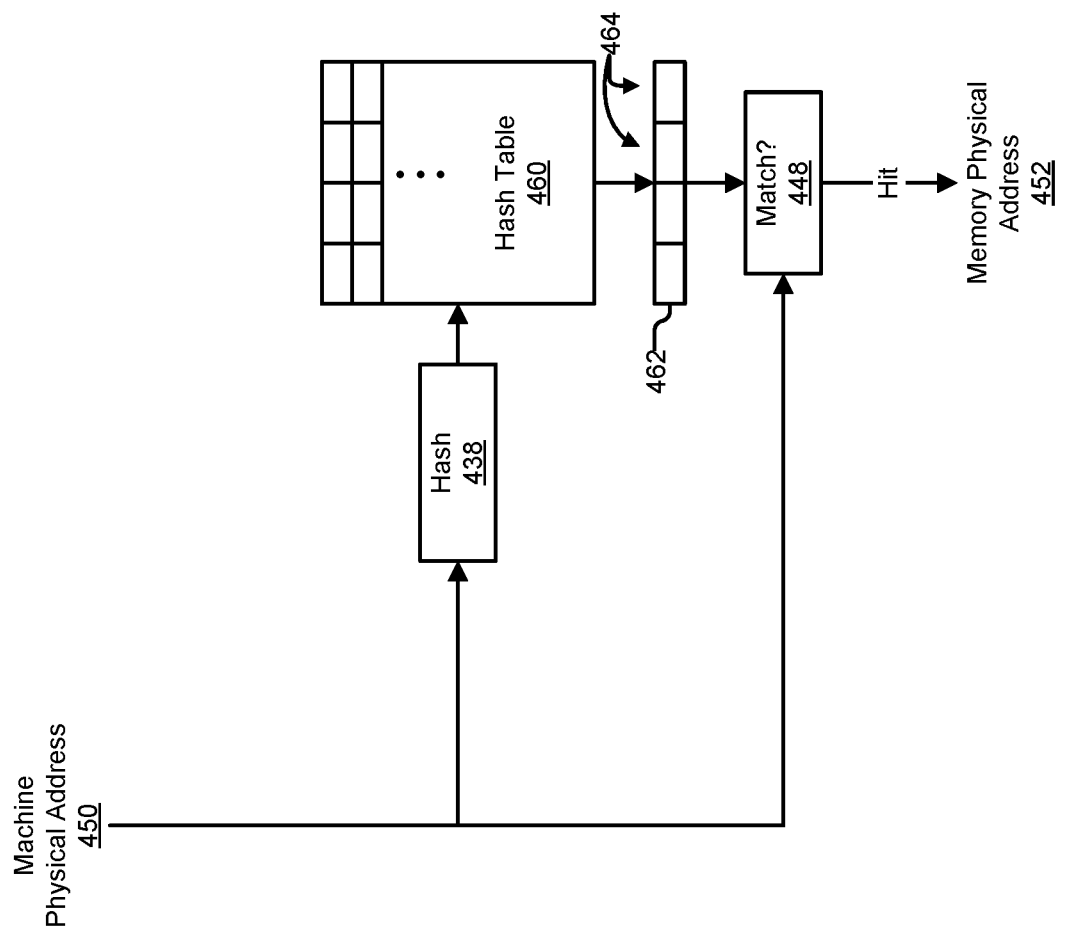
FIG. 4 illustrates an example of an address translation hit in the hash table of an address translation circuit.

Unlike a memory management unit, however, the memory controller 210 of FIG. 4 maps logical pages only to pages in the storage class memory 212, and not to any pages on disk or any other storage memory. Thus, page faults never occur. Because there is a one-to-one relationship between the logical pages understood by the host processor 202 and the physical pages in the storage class memory 212, the address space presented to the host processor 202 is not, strictly speaking, virtual. Thus, herein, logical pages are referred to as machine physical pages and the addresses used by the host processor 202 to access the storage class memory 212 are referred to as machine physical addresses. For clarity, pages in the storage class memory 212 are referred to herein as memory physical pages and addresses in the storage class memory 212 will be referred to as memory physical addresses. Translation from virtual address spaces, as understood, for example, by a virtual machine, to machine physical addresses can be handled by a hypervisor and/or the host processor 202. In various implementations, a page is the size of a memory block in the storage class memory 212.

In various implementations, the address translation 226 circuit can store machine physical-to-memory-physical addresses most recently used by the host processor 202. An address translation memory 232 can store a page table containing all machine physical page-to-memory physical page translations. When a particular address translation is not present in the address translation 226 circuit, the address translation 226 circuit can find the translation in the address translation memory 232. In some implementations, the address translation memory 232 can be part of the memory controller 210. In some implementations, the address translation memory 232 can be external to the memory controller 210, and is accessed using a memory interface.

In various implementations, the memory channel 228 can change (for example, using a microcontroller) the memory physical address that corresponds to a particular machine physical address. When this occurs, the memory channel 228 can update the address translation 226 circuit when the address translation 226 circuit has a translation for the particular machine physical address. Alternatively, the memory channel can update the address translation memory 232 when the address translation 226 circuit does not have the translation. In some implementations, when an address translation is updated in the address translation 226 circuit, the memory channel 228 or the address translation 226 circuit can also update the address translation memory 232. In some implementations, when an address translation is updated in the address translation 226 circuit, the updated translation is copied to the address translation memory 232 only when the translation is evicted from the address translation 226 circuit.

In various implementations, each memory channel 228 maintains a set of memory ranks, which constitute a portion of all the memory that the memory controller 210 makes available to the host processor 202. In the illustrated example, the memory controller 210 has an address translation 226 circuit for each memory channel 228. In this example, the address translation 226 circuit can store address translations for the address space managed by one memory channel 228. In other examples, the memory controller 210 can include fewer address translation 226 circuits, such as only one address translation 226 circuit, in which case the one address translation 226 circuit can store address translations for more than one set of memory ranks.

As noted above, the memory channels 228, in managing the ranks of storage class memory 212, can conduct wear leveling operations. For wear leveling, the memory channels 228 can, for example, swap heavily worn blocks with lightly worn blocks. As a further example, when blocks become unreliable, the memory channels 228 can migrate these blocks to the end of the logical address space, and can inform the hypervisor that less storage class memory 212 is available. In this example, the unreliable blocks are made inaccessible, and the amount of memory available from the storage class memory 212 decreases over time.

In various implementations, in addition to wear leveling operations, the memory channels 228 can also manage power-up initialization procedures and communications with a hypervisor executing on the system. Power-up initialization procedures can include, for example, identifying unusable blocks in the storage class memory 212, which may have been marked as unusable during manufacturing or during pervious operation of the system. Power-up initialization can further include assigning each useable block of storage class memory 212 to a machine physical page. The memory channels 228 can also determine the size of the memory available from the storage class memory 212, and inform the hypervisor.

Hypervisor communications can include coordination with the hypervisor when a new virtual machine is started, when a virtual machine becomes idle or goes to sleep, when a virtual machine wakes from a sleeping state, and/or when a virtual machine is shut down. When a virtual machine starts up, the memory channels 228 can, for example, identify an available region of the storage class memory 212 that can be assigned to the new virtual machine. In various implementations, the memory channels 228 can keep a map of virtual machine identifiers to the address space assigned to the virtual machine identifier. When a virtual machine becomes idle or goes to sleep, the memory channels 228 can, for example, inform the address translation 226 circuit, which can remove address translations for the virtual machine and free up space for other translations. When a virtual machine wakes up, in some implementations, the memory channels 228 can pre-fetch address translations from the address translation memory 232, and load these translations in the address translation 226 circuit. The memory channels 228 can, for example, use a lock indicator in the entries as an indicator that a translation should be pre-fetched. When a virtual machine shuts down, the memory channels 228 can, for example, inform the address translation 226 to remove any address translations for the virtual machine. In some implementations, the memory channels 228 can also trigger clearing or resetting of entries in the address translation memory 232 that are associated with the virtual machine.

Figure 3:
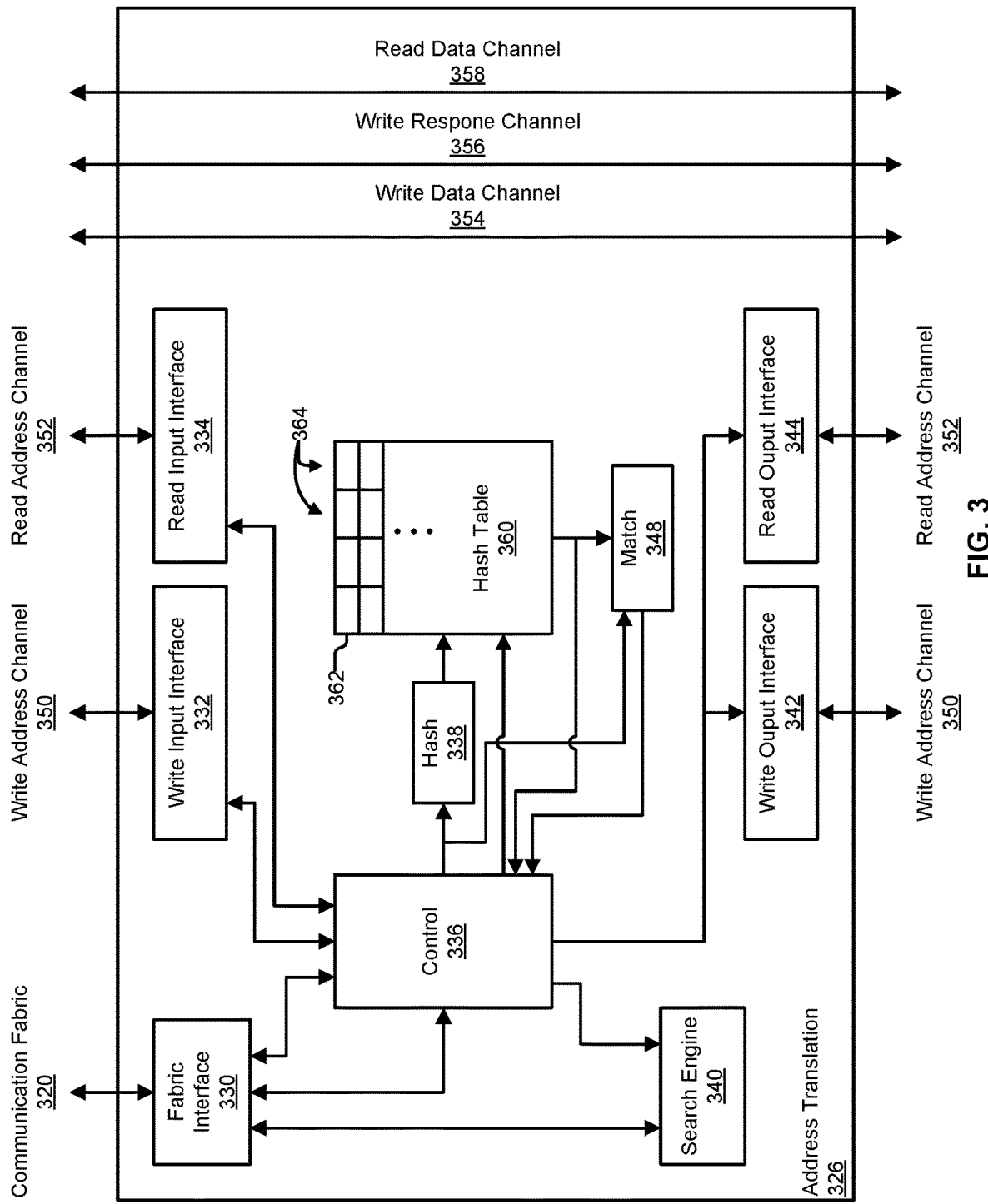
FIG. 3 illustrates in greater detail an example of an address translation circuit.

FIG. 3 illustrates in greater detail an example of an address translation 326 circuit. As discussed above, the example address translation 326 circuit can translate machine physical addresses to memory physical addresses. For storing address translations, the address translation 326 circuit can include a hash table 360, which can store the most recently used translations. The hash table 360 can also be referred to as an address translation table. The address translation 326 circuit can receive transactions through a write input interface 332 or a read input interface 334, and can output translated addresses through a corresponding write output interface 342 and read output interface 344. A control 336 circuit can orchestrate the operations of the address translation 326 circuit.

In various implementations, the write input interface 332 and write output interface 342 are in the path of a write address channel 350 between a host processor and storage class memory. Similarly, the read input interface 334 and read output interface 344 are in the path of a read address channel 352 between the host processor and storage class memory. The write address channel 350 and read address channel 352 can be routed through a communication fabric 320, and could possibly also pass through other blocks in a memory controller, but addresses on each channel are part of transactions that originate with the host processor. In various implementations, write output interface 342 and read input interface 334 can be "slave" interfaces, in that these interfaces implement the part of a communication protocol that makes these interfaces targets or recipients of addresses.

On the output side of the address translation 326 circuit, the write address channel 350 and read address channel 352 can also be routed through the communication fabric 320 or can be connected directly to a memory channel. In various implementations, the write output interface 342 and read output interface 344 can implement the part of a communication protocol that makes these interfaces "masters," or interfaces capable of initiating or driving transactions.

In the illustrated example, the system includes separate channels for write addresses and read addresses. In other examples, write and read addresses can be transferred over the same channel (e.g., the same bus or set of wires).

Write transactions can also include write data and write responses, and read transactions can include read data. In the illustrated example, the write data is transferred from the host processor to memory on a write data channel 354, write responses (e.g., success or failure indicators, error indicators, etc.) are transferred from memory to the host processor over a separate write response channel 356, and data read from memory is also transferred over a separate read data channel 358. The example address translation 326 circuit does not operate on the data part of a transaction, thus these data channels pass through the circuit to rejoin the address channels on the output side of the circuit. In various implementations, the write data channel 354, write response channel 356, and read data channel 358 can be routed through the communication fabric 320 prior to being input into the address translation 326 circuit, though the data on these channels originate from or end up at the host processor. On the output side of the address translation 326 circuit, the data channels can also be routed through the communication fabric 320 prior to reaching the storage class memory, or can be input into or output from a memory channel.

In other examples, both read and write data can be transferred over a same data channel. In some examples, write response data can also be transferred over the same data channel. In some examples, there may be no write response data.

In various implementations, the address translation 326 circuit can also include a fabric interface 330 that enables host processor access to the address translation 326 circuit and for the address translation 326 circuit to be able to communicate with other blocks in the memory controller. For example, the address translation 326 circuit can use the fabric interface 330 to read an address translation memory that stores all address translations. The address translation 326 circuit may also be able to receive transactions over the fabric interface 330. For example, updated translations from a memory channel can be received at the fabric interface 330. As another example, the memory channel can read the hash table 360 through the fabric interface 330, for example to ensure that a translation stored in the hash table 360 is consistent with a translation stored in the address translation memory. Other examples of transactions that can be received at the fabric interface 330 include configuration writes from the host processor or from other blocks in the memory controller.

In various implementations, a control 336 circuit can manage the operations of the address translation 326 circuit. The control 336 can, for example, arbitrate between the fabric interface 330, the write input interface 332, and the read input interface 334 to determine which will next have access to the hash table 360. As another example, the control 336 circuit can update entries in the hash table 360 when necessary. As a further example, the control 336 circuit can start the search engine when the address translation 326 circuit receives a search request. As another example, the control 336 circuit can execute an address translation when a read or write address is received, and can output the translated address to the write output interface 342 or read output interface 344, as appropriate. In some implementations, some signals from the write address channel 350 and read address channel 352, such as address valid signals, pass directly from the input interfaces to the output interfaces, unmodified.

In various implementations, the each row 362 in the hash table 360 can include multiple entries 364, where each entry 364 stores an individual address translation. The control 336 can select a particular row 362 by inputting a machine physical address (e.g., a write address, a read address, or an address received through the fabric interface 330) into a hash 338 function. The hash 338 function can output an index value that can be used to select a row. For example, if the hash table 360 has 4096 rows, the hash 338 function can output a 12-bit value. In some examples, the hash 338 function can be implemented using a 16-bit cyclic redundancy check (CRC) function with two different polynomials.

To identify an entry in a row 362 that corresponds to an input machine physical address, the address and the row 362 can be input into a match 348 function. The match 348 function can determine whether any entry in the row 362 is storing a machine physical address that matches the input address. In some implementations, the entry contains only a part of a machine physical address. For example, the portion of machine physical address that can be used to address a block of storage class memory can be stored. For example, when the block size is 4 KB, any number bits above bit 12 can be stored in the entry.

The match 348 can match the input address against each of the entries 364 in the row 362. The row 362 can include, for example, 8 or 16 or some other number of entries 364. An entry includes a matching stored machine physical address when each bit of the machine physical address stored in the entry is the same as the corresponding bits in the input address. For example, when the entry stores bits [42:12] (bits 42 to 12, inclusive) of a machine physical address, the bits [42:12] of the input address must be the same as the bits stored in the entry.

When a match is found in a row 362, the match 348 function can return, to the control 336 circuit, a memory physical block number stored in the entry. The control 336 circuit can use the memory physical block number and the original input address to generate a translated address. For example, when the entry stores bits [42:12] of a memory physical block number, the control 336 can replace bits [42:12] of the input address with the memory physical block number. In this example, bits [11:0] and any bits over bit 42 in the input address stay the same. The control 336 circuit can output the translated address to the write output interface 342 or the read output interface 344, as appropriate, or to the communication fabric 320 when a translation was requested by another block. Other operations, discussed further below, can also occur when a matching entry is found in a row 362.

When no match is found in a row 362, the control 336 circuit can read the desired address translation from the address translation memory. In various implementations, the address translation memory stores a page table that contains machine physical page-to-memory physical page translations. In some cases, the address translation memory includes an address translation for each memory physical page in the storage class memory managed by the memory controller. To find the desired translation, the control circuit can use the original input address to address the address translation memory. For example, when the pages are 4096 bytes in size, bits [63:12] of the input address can represent a machine physical page number. In this example, the machine physical page number can be used as a read address for the address translation memory. The data read from the address translation memory can provide the memory physical block number. In some implementations, the address translation 326 circuit has direct access to the address translation memory (e.g., can communicate directly with the read and write ports of the memory). In some implementations, the address translation memory is managed by a separate memory controller block, and the address translation 326 circuit can access the address translation memory through this separate memory controller block.

In various implementations, before adding a new translation to the hash table 360, the control 336 can determine which, if any, entry in a row 362 (identified, as discussed above, using the output of the hash 338 function) should be replaced, a processes referred to as eviction. When the row 362 has unused entries (as indicated, for example, by a valid indicator for each entry), then the new translation can be written to an unused entry. When the row 362 does not include unused entries, then the control 336 circuit can use information stored by each entry to determine which entry to evict. For example, each entry can store a least recently used (LRU) indicator, which can be used to identify the oldest or an entry that has been used less recently than other entries in the row 362. In this example, the least recently used entry can be given priority for replacement. As another example, each entry can store an "evictable" indicator, which indicates that the entry should be considered for eviction ahead of all other entries in the row 362. The evictable indicator can be set, for example, by a virtual machine that is using the entry, an application executing in the virtual machine, an operating system executing on the system, an application executing on the operating system, and/or the host processor. The evictable indicator can indicate, for example, that an application does not expect to use the translation again, or at least will use the translation very infrequently.

The control 336 circuit, however, may have to also consider other information stored in an entry. For example, each entry can include a lock indicator, which, when set, indicates that whichever application that is using the entry does not want the translation stored in the entry to be removed. Entries with the lock indicator set have lowest priority for eviction. In some cases, locked entries can still be removed. For example, when a locked entry is the least recently used in a row, the locked entry may be evicted if no other entries can be evicted.

In various implementations, when an entry is evicted from the hash table 360, data from the entry can be written to the address translation memory. For example, the lock indicator and/or evictable indicator can be written to the address translation memory.

In some implementations, the entry may be storing an address translation that is more current than the address translation stored in the address translation memory. For example, when a memory channel determines a new memory physical address for a particular machine physical address, the memory channel can send the new translation to the address translation 326 circuit. In this example, when the hash table 360 does not have a translation, the memory channel will update the address translation memory with the updated translation for the particular machine physical address. When the hash table 360 does have a translation for the machine physical address, the memory channel can update the hash table 360 and not expend additional cycles also updating the address translation memory. In this example, when the entry is later evicted, the memory physical address stored in the entry can be written to the address translation memory.

In some implementations, the address translation 326 circuit can ensure that each virtual machine executing on the system gets entries in the hash table 360. In these implementations, competition for entries in the hash table 360 is reduced and hash collisions may occur less frequently, thus possibly improving the overall efficiency of the system. In these implementations, part of the hash table 360 can be made available to all virtual machines, and a part of the hash table 360 can be subdivided among each possible virtual machine identifier. For example, in a hash table 360 that has 16,384 rows, a set of rows including half of the available rows can be made available to all virtual machines. Additionally, the memory controller can be programmed to support 1024 virtual machines. In this example, each virtual machine can have a dedicated set of, for example, eight rows. When each row has 16 entries, each virtual machine is guaranteed to have at least 128 entries to itself.

In some implementations, all virtual machines that are supported by the system can have a dedicated set of rows. In some implementations, there are fewer sets than there are possible virtual machine identifiers, so that space in the hash table 360 is not left empty for idle or unused virtual machine identifiers. In these implementations, the control 336 can keep track of the set of rows that is currently assigned to a virtual machine identifier. Each row in the set and/or each entry can also store a virtual machine identifier that identifies the virtual machine that the row or entry is currently assigned to. In these implementations, the set of rows that are assigned to a particular virtual machine can be identified by an output from the hash 338 function. For example, the virtual machine identifier can be input into the hash 338 function, and the resulting output value can be used to identify a row in the hash table 360 (e.g., the output value can be added to or subtracted from the index produced by hashing the input address, to produce the index to use to read the hash table 360). A set of rows dedicated to a particular virtual machine can be contiguous, or can be spread among the available rows, with the rows being determined by the hash 338 function.

In various implementations, a virtual machine identifier can be embedded in each inbound machine physical address, for example in bits of the address or in bits of the address that are not being used (e.g., because the bits are outside the address range of the storage class memory). Alternatively or additionally, the control 336 circuit may be able to identify a virtual machine from the input machine physical address; for example, the virtual machine may be identifiable from an address range that the input address falls into. Alternatively or additionally, in some implementations, the system's operating system or a hypervisor managing the virtual machines can program the control 336 circuit to determine, given an input machine physical address, a virtual machine identifier. For example, the control 336 circuit may be able to store a mapping of the address ranges assigned to each virtual machine.

In various implementations, in addition to or instead of dedicating sets of rows in the hash table 360 to different virtual machines, the address translation 326 can include occupancy limit counters for each virtual machine. The occupancy limit counters can keep track of the number of rows and/or entries occupied by each virtual machine. In some implementations, a virtual machine can read the counters being maintained for that virtual machine. In various implementations, the control 336 circuit can be programmed with a maximum threshold. When the occupancy limit counter for a particular virtual machine is at or above the threshold, the control 336 circuit can take action to stop the virtual machine from occupying more entries. For example, the control 336 circuit can stop assigning new entries to the virtual machine, thus forcing the virtual machine to use existing entries. As another example, the control 336 can stop storing any additional translations for the virtual machine, so that the virtual machine experiences address translation misses. In these and other examples, the control 336 can stop these actions when the occupancy limit counter(s) for the virtual machine has dropped below the threshold.

In various implementations, the control 336 circuit can also include functionality for managing the hash table 360. This functionality can be triggered by, for example, the operating system, the hypervisor, a virtual machine, and/or a memory channel associated with the address translation 326 circuit. For example, the control 336 circuit can include one or more registers that, when written to, can activate a management function. Management functions can include, for example, loading a particular translation into the hash table 360, setting an attribute in an entry, invalidating an entry, and/or invalidating all entries associated with a particular virtual machine identifier. In some cases, a management function can be requested by a virtual machine, a hypervisor, the operating system, or a component of the memory controller 210, such as the memory channel. In some cases, only the hypervisor, operating system, or a component such as the memory channel can request that a particular management function be performed.

Loading a particular translation into the hash table 360 is a management operation that includes reading a particular translation from the address translation memory and placing the translation in the hash table 360. In various implementations, when the control 336 circuit receives a request to load a translation, the control 336 circuit can first determine an identity of the application or hardware component that request the load. For example, when a virtual machine requested the load, for security purposes, the control 336 circuit can check whether virtual machine is requesting loading a translation for an address that the virtual machine has permission to access. In this example, the virtual machine may not, for example, be able to load address translations for addresses that are not in the address space of the virtual machine. As another example, when the load was requested by a hypervisor or a memory channel, the load can be allowed.

In some cases, when loading a translation from the address translation memory, the control 336 circuit may have to evict the data from an entry to make the entry available for loading the translation. The control 336 circuit can consider a least recently used value, a lock indicator, and/or an evictable indicator, when present, as discussed above.

In various implementations, once the requested translation has been stored in the hash table 360, the control 336 circuit can inform the application or hardware that request the load that that the load has been completed. For example, the control 336 circuit can set a completion value in a register, which can be read by software or hardware. The load can otherwise be treated the same as a load that happens through address translation requests. For example, values such as an occupancy counter can be incremented.

In some cases, the control 336 circuit may not have been able to load the translation. For example, a virtual machine may have requested to load an address that the virtual machine is not allowed to access, or the virtual machine's occupancy limit may have been exceeded. In these cases, the control 336 circuit can indicate that the load failed, for example by setting a failure value in a register that can be read by software.

Attributes that can be modified in an entry in the hash table 360 include a lock indicator and/or an evictable indicator, among other things and when present. A request to modify attributes can be accompanied by a machine physical address that identifies a translation to which the attributes apply. In various implementations, when modifying attributes, the control 336 circuit can conduct checks on the request, such as verifying whether a virtual machine that requested the modification is permitted to use the address whose translation is stored in the entry.

When the address translation to which the modification is to apply is in the hash table 360, the control 336 circuit can modify the attributes as specified (e.g., setting or clearing a lock bit, setting or clearing an evictable bit, etc.). When the address translation is not present in the hash table 360, in some implementations, the control 336 circuit can load the address translation and then modify the entry into which the address translation is stored. In these implementations, the control 336 circuit may have to evict the data in an entry, as discussed above. Also in these implementations, the control 336 circuit can also update the entry in the address translation memory for the address translation, for example by sending a write transaction to the address translation memory. Alternatively, in some implementations, when the address translation is not in the hash table 360, the control 336 circuit can update the address translation memory without also loading the address translation into the hash table 360.

In various implementations, once the attribute modification is complete, the control 336 circuit can inform the requester, for example by indicating success or failure in a register that can be read by software.

Invalidating an entry in the hash table 360 is similar to an attribute modification, in that a valid indicator in the entry can be un-set or set to false. Invalidating an entry, however, is also similar to evicting the data from the entry, in that the data may need to be copied to the address translation memory. A request to invalidate an entry in the hash table 360 can be accompanied by a machine physical address that identifies the entry. In various implementations, when modifying attributes, the control 336 circuit can conduct checks on the request, such as verifying whether a virtual machine that requested the modification is permitted to use the address whose translation is stored in the entry.

For an entry to be invalidated in the hash table 360, an address translation for the machine physical address that accompanied the request must be present in the hash table 360. When the address translation is not present, no entries are changed. When the address translation is not present, the control 336 circuit may indicate that the invalidation failed. When the address translation is present, the valid indicator in the entry can be set to false, if necessary, and any data in the entry can be copied to the address translation memory. In some cases, the control 336 circuit can then indicate that the invalidation was successful.

In various implementations, the address translation 326 circuit can also enable invalidation of all entries in the hash table 360 that are being used by a particular virtual machine. Invalidating all the entries used by a virtual machine can occur, for example, when the virtual machine has shut down. In some implementations, invalidation can also occur when the virtual machine is idle or sleeping. In these implementations, entries in the hash table 360 can be freed for other virtual machines to use. In some implementations, a hypervisor can determine whether a virtual machine is idle or sleeping, and can request for the address translation 326 circuit to invalidate all of the entries being used by the virtual machine. In some implementations, only the virtual machine or a memory channel can invalidate all the entries for a virtual machine.

To invalidate all of the entries for a particular virtual machine, in various implementations, the control 336 circuit can walk the hash table 360 to find any entries that are being used by the virtual machine. In some implementations, the entries store a virtual machine identifier that the control 336 circuit can use to determine which virtual machine that is using a particular entry. In some implementations, when a set of rows is dedicated to the virtual machine, the control 336 circuit can clear these rows directly. In these implementations, the control 336 circuit may only need to walk the shared rows of the hash table 360.

In some implementations, when the invalidation is complete, the control 336 circuit can inform the software or hardware that requested the invalidation, for example by writing a status in a register. In some implementations, the control 336 circuit can send an interrupt that can be received by another block in the memory controller (such as a microcontroller the memory channel) and/or by the host processor.

In various implementations, the address translation 326 circuit can include other functionality. For example, the entries in the hash table 360 can include a write counter that can be incremented each time the address being translated is for a write transaction. In some implementations, the entries store a memory physical block number, thus the write counter can track writes to the memory physical block in the storage class memory. The write counter can be used, for example, to keep track of the number of program cycles that the particular block has experienced. In some implementations, when the write counter reaches a programmable threshold, the control 336 circuit can write the value of the write counter to a statistics log stored elsewhere in the memory controller or in the storage class memory. In some implementations, when an entry is evicted, the write counter will also be written to the statistics log.

Another function that can be included in the address translation 326 circuit is a search engine 340. In various implementations, the search engine 340 can read entries in a page table that is stored in the address translation memory, and locate specified entries. In some implementations, the search engine 340 can step through each entry in the page table. In some implementations, the search engine 340 can step through a specified set of entries (specified, for example, using an offset and counter). In some implementations, the search engine 340 can locate entries using regular expression matching. For example, the search engine 340 can find entries that match a particular memory physical address, ignoring any other values stored in the entry. As another example, the search engine 340 can find entries where the memory physical address falls within a range or matches a particular pattern. As another example, the search engine 340 can find entries that have a lock indicator, evitable indicator, and/or dirty indicator set or not set, and any memory physical address is considered matching.

For matching entries, in various implementations, the search engine 340 can perform an action. For example, the search engine 340 can clear (e.g., set to false or not set) the lock indicator and/or the evictable indicator. As another example, the search engine 340 can set (e.g., write a value to) or clear (e.g., write all zeros or all ones to) the memory physical address stored in the matching entry. As another example, the search engine 340 can store the indexes of one or more matching entries. These indexes can then be read by software and/or by other blocks in the memory controller, such as the memory channel. In various implementations, when the search engine 340 modifies an entry in the address translation memory, the search engine 340 can also modify an entry in the hash table 360 when the entry in the hash table is for the same translation that is stored in the entry in the address translation memory that is being modified.

In various implementations, the search engine 340 can be configured and started using transactions received through the fabric interface 330. For example, the search engine 340 can include registers that can be programmed with search parameters. As another example, a particular register, when written to, can cause the search engine 340 to start a search. Searches can be triggered, for example, by a virtual machine, a hypervisor, the operating system, and/or other blocks on the memory controller, such as a microcontroller of the memory channel. In various implementations, the search engine 340 can conduct the search by sending read and/or write transactions through the fabric interface 330 to the address translation memory.

FIG. 4 illustrates an example of an address translation hit in the hash table 460 of an address translation circuit. An address translation hit occurs when a particular address translation is present in the hash table 460. In the illustrated example, some components of the address translation circuit have been omitted for the sake of clarity.

As discussed above, address translation begins when the address translation circuit receives a machine physical address 450. The machine physical address 450, which can also be referred to as a processor address, can be for a read transaction or a write transaction from the processor. In some cases, the machine physical address 450 is from another component of the memory controller, such as when a memory channel is reading or updating the hash table 460 and/or trying to determine whether the machine physical address 450 is present in the hash table 460. In each case, the machine physical address 450 is in the address space used by and understood by the host processor.

The address translation circuit can input the machine physical address 450 into a hash 438 function. The hash 438 function can output an index value that can be used to read a row 462 from the hash table 460.

In some implementations, the hash 438 function can also output an index value that is relative to a virtual machine identifier. This index value, referred to herein as a virtual machine index, can be used to read a row in the hash table 460 from a set of rows that is reserved for a particular virtual machine identifier. For example, the virtual machine index can be an index to a specific row in the hash table 460. Alternatively, the virtual machine index can be an offset from an overall index value computed using the machine physical address 450.

In some implementations, the virtual machine index can be determined from a virtual machine identifier that is received with the machine physical address 450. Alternatively, the virtual machine identifier can be determined from the machine physical address 450. In the latter case, the memory controller may, for example, have a map of virtual machine address spaces (e.g., the physical addresses assigned to a virtual machine) to virtual machine identifiers. In some implementations, the virtual machine index can be determined directly from the machine physical address 450. For example, virtual machine address spaces can be assigned such that the virtual machine identifier resides in certain bits of the machine physical address 450, or correlate to certain bits in the machine physical address 450. As another example, the virtual machine index can be provided to the address translation 426 circuit over a sideband bus that may be part of the write address channel 450 and/or the read address channel 452.

When part of the hash table 460 is indexed using a virtual machine identifier, the other index that the hash 438 function can generate (derived from the machine physical address 450 without specifically considering the virtual machine the address is associated with) can be used to index a shared part of the hash table 460. In some implementations, the address translation circuit can read two rows at the same time, one from the shared set of rows and another from the set of rows assigned to the virtual machine identifier. In these implementations, the address translation circuit can input both rows into the match 448 function, and check entries in both rows for a match. Alternatively, the address translation circuit can consider one row first, for example the row from the virtual machine specific set of rows, and read and consider the other row only if no match is found in the first row.

In various implementations, at least one row 462 is read from the hash table 460 and input into the match 448 function. The match 448 function can determine whether any entry from among the entries 464 in the row includes a stored machine physical address that matches the input machine physical address 450. Matches, in this context, mean that the stored machine physical address is the same as the machine physical address 450. In some implementations, the entries 464 store only part of the machine physical address, in which case only the part of the machine physical address 450 that corresponds to what is stored needs to match. For example, when the entries store only bits [42:12] of the machine physical addresses, then only bits [42:12] of the input machine physical address 450 needs to match what is stored. In various implementations, once the match 448 function finds a matching entry in the row 462 (in other words, a hit), the match 448 function can stop looking.

In various implementations, the matching entry includes a memory physical address 452 (also referred to as a processor memory address) or a partial memory physical address. When the matching entry includes an entire memory physical address 452, the address translation circuit can output the memory physical address 452, to be used to access processor memory (e.g., storage class memory). When the matching entry includes a partial memory physical address, the part can be combined with parts from the input machine physical address 450 to generate the memory physical address 452. For example, the upper bits of the memory physical address 452 can be taken from the stored memory physical address and the lower bits can be taken from the input machine physical address 450.

In various implementations, data stored in the entries 464 in the row 462 can also be updated when a matching entry is found. For example, when the entries store a least recently used counter, the least recently used counter for the matching entry can be set to zero, and for all the other occupied entries in the row 462, the least recently used counter can be incremented (unoccupied entries, that is, entries that are not presently in use, can be left unchanged). As another example, when the machine physical address 450 is for a write transaction, a write counter in the matching entry can be incremented and possibly also sent to a statistics log. In this example, when the write counter is written to the statistics log, the write counter may also be reset to zero.

In some implementations, when a matching entry is found in the hash table 460, the address translation circuit can inform the originator of the machine physical address 450. For example, when a memory channel requested the translation, the address translation circuit can inform the memory channel that a match was found. The address translation circuit can, for example, send a write response to a write transaction that initiated the translation. As another example, the address translation circuit can initiate a write transaction to the memory channel, where the write transaction and/or the data being written will inform the memory channel that a match was found.

Figure 5:
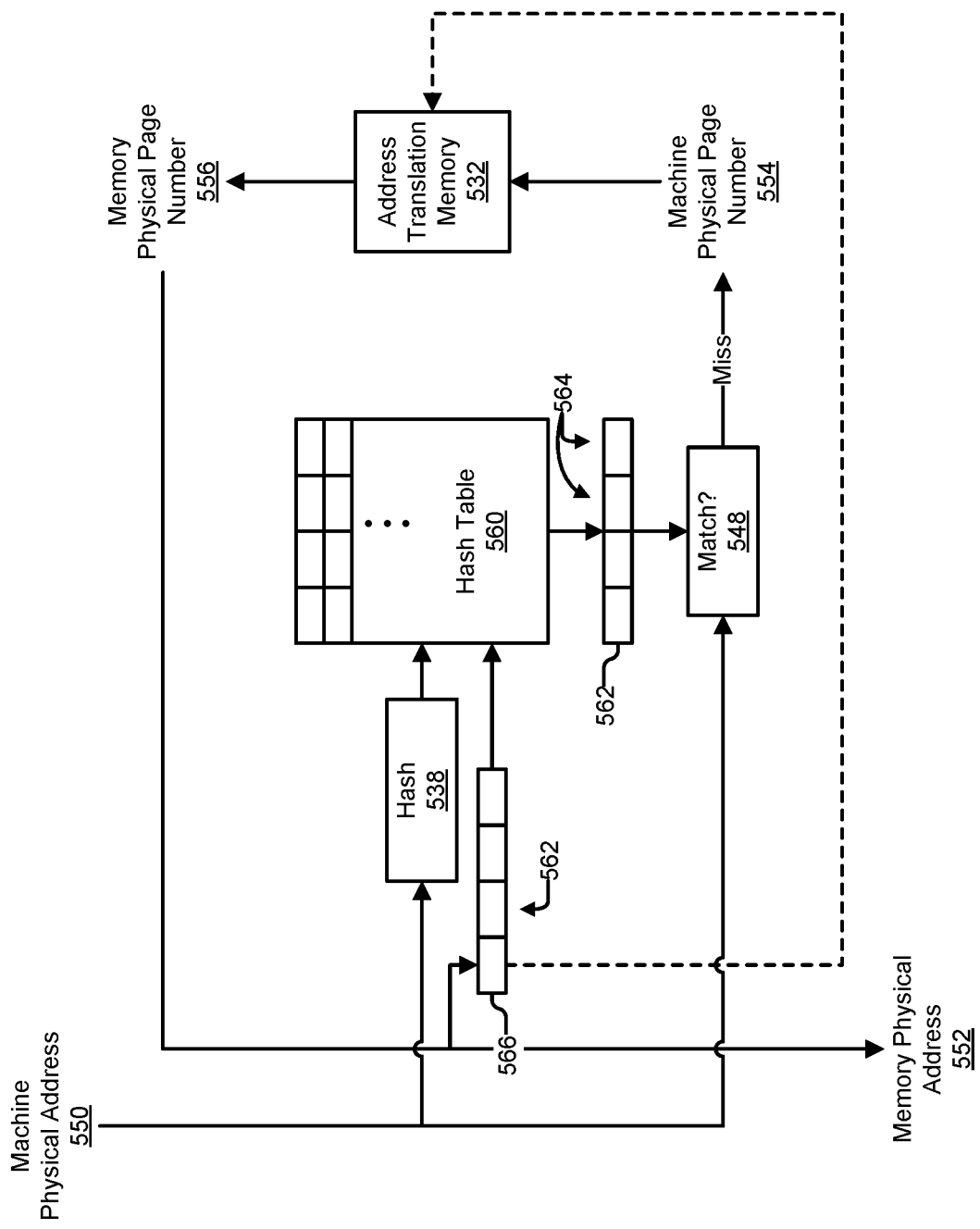
FIG. 5 illustrates an example of an address translation miss in the hash table of an address translation circuit.

FIG. 5 illustrates an example of an address translation miss in the hash table 560 of an address translation circuit. An address translation miss occurs when a particular address translation is not currently present in the hash table 560. In the illustrated example, some components of the address translation circuit have been omitted for the sake of clarity.

As discussed above, when the address translation circuit receives a machine physical address 550 for translation, the address translation circuit can input the machine physical address 550 into a hash 538 function. The hash 538 function can output an index value for reading a row 562 from the hash table 560. In some implementations, the index value can be used to read a row from a set of rows that are shared among all the virtual machines that can execute on the system. In some implementations, the index value can be used to read a row from a set of rows that are reserved for a particular virtual machine identifier. In some implementations, the address translation circuit uses the hash 538 to produce a separate virtual machine index, in addition to an index value determined from the machine physical address 550 without considering the virtual machine that may be associated with the machine physical address 550. In some implementations, the address translation circuit can read more than one row, one from the shared part of the hash table 560 and one from the set of rows dedicated to a virtual machine. In these implementations, the address translation circuit can examine the entries in both rows, or can consider the entries in one row first, and consider the second row only if no match is found in the first row.

The row 562 or rows read from the hash table 560 can be input into a match 548 function. The match 548 function can determine whether any of the entries 564 is storing a machine physical address that matches the input machine physical address 550. In this example, no match is found (a translation miss). A miss means that either each of the entries 564 is not currently being used (e.g., a valid indicator is not set or set to false) or that the entries 564 are storing translations for other machine physical addresses.

In various implementations, when the match 548 function indicates a miss, the address translation circuit can read a translation from an address translation memory 532. The address translation memory 532 can store a memory physical page number for each memory physical page in the memory being managed by the memory controller. Because all of the memory is mapped, a translation should always be found.

In various implementations, the address translation memory 532 can be read using a machine physical page number 554. The machine physical page number 554 can be obtained from the input machine physical address 550. For example, when the page is 4 KB in size, bits above bit 12 of the machine physical address 550 can represent a machine physical page number. The machine physical page number 554 can be used as an address to read an entry in the address translation memory 532. The entry can contain a memory physical page number 556 that corresponds to the machine physical page number 554. The memory physical address 552 can be generated using the machine physical address 550 and the memory physical page number 556.

For example, when the block size is 4 KB, bits [11:0] of the memory physical address 552 can come from the machine physical address 550, and bits 12 and above can come from the memory physical page number 556. The address translation circuit can output the memory physical address 552 for use in accessing the storage class memory.

In some implementations, the address translation memory 532 is directly accessible to the address translation circuit, meaning that the address translation can input the machine physical page number 554 directly into the read ports of the address translation memory 532. In some implementations, the address translation circuit can read the address translation memory 532 over the communication fabric of the memory controller.

In various implementations, the translation read from the address translation memory 532 is stored in an entry in the row 562 that was read from the hash table 560. The row 562 can be from the set of rows dedicated to a particular virtual machine, or from the set of rows that are shared among all virtual machines. In some implementations, the address translation circuit can consider two rows, one from the set dedicated to the virtual machine and one from the shared set. In these implementations, the address translation circuit can search for an entry to use in the virtual machine-specific row first, and then search the row from the shared set.

Whether considering one row 562 or two, when the address translation circuit finds an entry that is not used, the address translation circuit can store the new translation in this unused entry. When the row 562 or rows do not include any unused entries, the address translation circuit can determine an entry to evict.

To decide on an entry to evict, the address translation circuit can consider, for example, a least recently used value stored with each entry, a lock indicator, and/or an evictable indicator. In some implementations, locked entries are given lowest priority for eviction and evictable entries are given highest priority. When both the lock indicator and the evictable indicator are set, in some implementations, the address translation circuit errs in favor of the lock indicator, and ignores the evictable indicator. In some implementations, the least recently used value is considered before considering the lock and eviction indicators, with locked entries possibly being skipped for the next recently used entry. In some implementations, the least recently used value is considered after the lock indicator and evictable indicator have been considered. In some implementations, the least recently used value is not considered when at least one entry is marked as evictable. In some implementations, the least recently used entry can be evicted even though the entry is locked. For example, all the entries may be locked, or all other entries have been used frequently and the locked entry has not been used for a very long time. In some implementations, locked entries are never evicted, and if no entries are available to store the newly fetched translation, the translation is not stored.

Having determined an entry 566 into which to store the newly fetched translation, in various implementations, the address translation circuit can write the machine physical address 550 and the memory physical address 552 into the selected entry. In some implementations, only the machine physical block number part of the machine physical address 550 and the memory physical block part of the memory physical address 552 are written into the entry 566. In some implementations, a value for a lock indicator and/or a value for an evictable indicator can also be written. The lock indicator and/or the evictable indicator may have been read from the address translation memory 532, along with the address translation, or can be set based on information provided to the address translation. For example, virtual machine may have indicated that a particular translation or all translations for a particular page be locked or evictable. The least recently used value and a write counter (if included in the entry 566) can be set to zero.

When the entry 566 into which the new translation is being written was previously occupied, in some implementations, data from the entry 566 can be written into the address translation memory 532. For example, a lock and/or evictable indicators can be written to the address translation memory 532, so that these indicators can be remembered for the next time the evicted translation is used. As another example, the memory physical address stored in the entry can be written to the address translation memory 532, particularly in cases when the hash table 560 may have a more recent translation than is stored in the address translation memory 532.

In some implementations, before considering whether to evict an entry from the row 562, the address translation circuit can determine whether the virtual machine associated with the machine physical address 550 is at or above an occupancy limit. For example, the address translation circuit can maintain occupancy counters for each virtual machine, where the counters keep track of the number of rows and/or entries in the hash table 560 that are being used by the virtual machine. When the occupancy counter or counters are at or above a threshold, the address translation circuit can take one or more actions. For example, the address translation circuit can select an entry to evict only from the row that came from the set of rows dedicated to the virtual machine. As another example, the address translation circuit can bypass storing the newly retrieved translation, so that the virtual machine will experience another miss when attempting to use the translation. When the occupancy counter or counters are below the threshold, address translation circuit can increment the counter(s) when the new translation is stored in an entry that was not previously being used by the same virtual machine. When an entry being used by the virtual machine is evicted, the occupancy counter(s) can be decremented.

Figure 6:
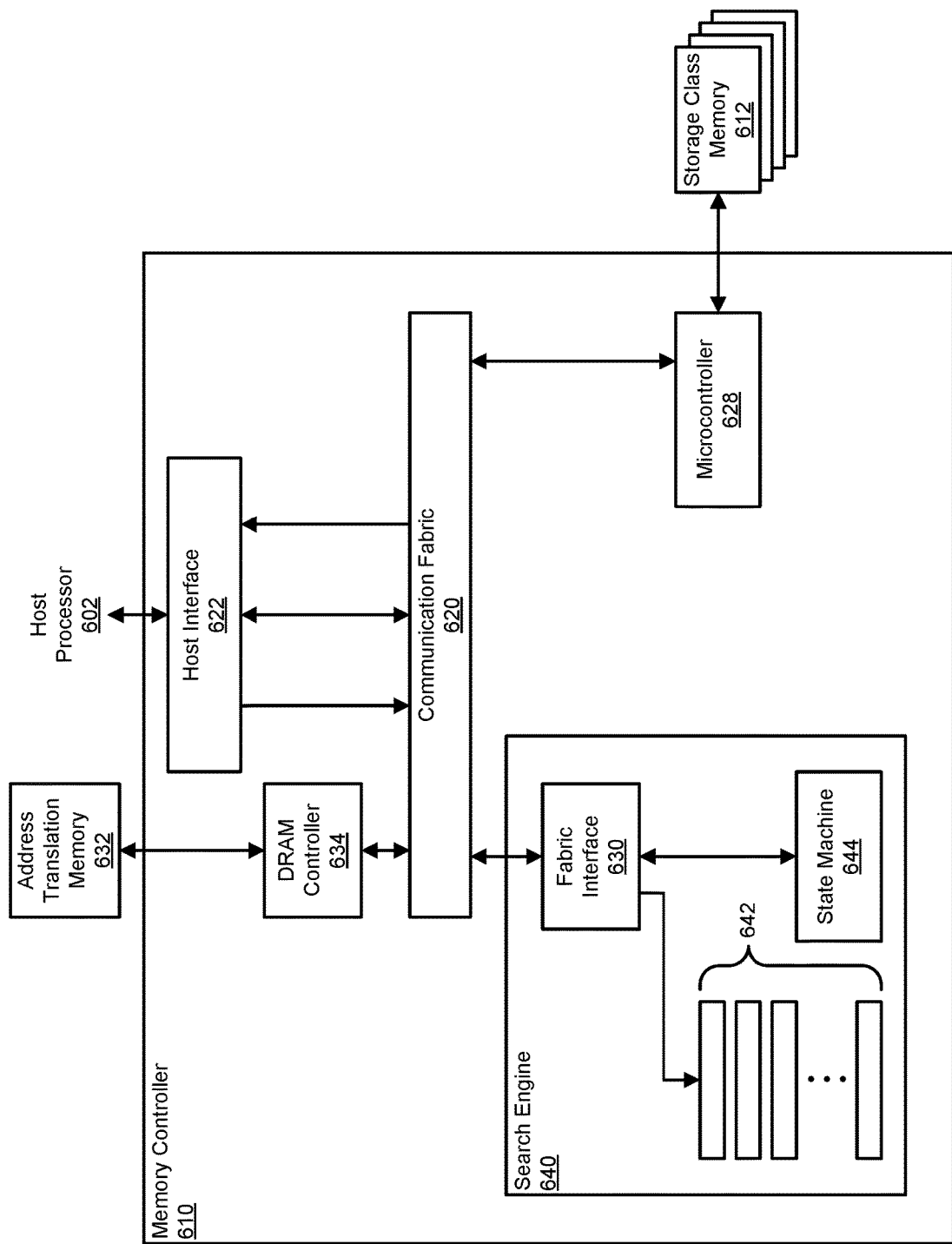
FIG. 6 illustrates an example of a memory controller that includes a search engine.

As noted above, in some implementations, a memory controller for storage class memory can include a search engine. FIG. 6 illustrates an example of a memory controller 610 that includes a search engine 640. The example memory controller 610 also includes a host interface 622 through which the memory controller 610 can communicate with a host processor 602 and a communication fabric 620 through which the internal components of the memory controller 610 can communicate with each other. In addition to the search engine 640, the internal components of the memory controller 610 can include a microcontroller 628 and a DRAM controller 634. The microcontroller 628 can be used by the memory controller 610 to maintain the storage class memory 612 that is controlled by the memory controller 610. Through the DRAM controller 634, the memory controller 610 can communicate with an address translation memory 632, which can be implemented using DRAM or another memory technology. In some implementations, the address translation memory 632 can be small enough to be within the memory controller 610 (e.g., on the same chip), in which case the DRAM controller 634 can be omitted.

In various implementations, the memory controller 610 can use the search engine 640 to maintain a page table stored in an address translation memory 632. The page table can store address translations for the storage class memory 612, wherein an address translation associates a machine physical address (e.g., a processor address, or an address used by the host processor 602) with a memory physical address (e.g., a processor memory address, or an address in the storage class memory 612). As an example, when the storage class memory 612 includes 32 TB of memory and pages are 4 KB in size, the page table can include about 10 billion entries. In some examples, the page table stores an address translation for every page in the storage class memory 612. In some examples, the page table stores address translations for only available pages, where unavailable pages are in blocks of addresses that have become too worn out to use. In some examples, the page table stores all address translations for the storage class memory 612, and address translations for worn out pages are mapped to machine physical page numbers that are outside the machine physical address space currently being used by the system's host processor 602.

Maintenance of the page table can include updating address translations. The memory controller 610 may periodically change associations between machine physical addresses and memory physical addresses. For example, the memory controller 610 may determine that a particular block of the storage class memory 612 is being written too frequently. In this example, the memory controller 610 can migrate the data in the block to a different block, and change the address translation in the page table so that the machine physical address mapped to the old block now maps to the new block. Other maintenance operations on the page table can include, for example, locating and modifying ranges of address translations, such as all the address translations for the address space of a particular virtual machine or a subset of address translations for a particular virtual machine. Modifications can include, for example, setting values for attributes (e.g., lock and/or evictable indicators, among other attributes).

The page table can be maintained by the host processor 602, but doing so may mean having the host processor 602 take over operations better suited to the memory controller 610. For example, a frequent maintenance operation is to locate and update address translations in the address translation memory 632. In this example, the memory controller 610 can determine a new address translation, but then would have to interrupt the host processor 602 for the host processor 602 to then, first, read the new translation from the memory controller 610, second, find the previous translation in the address translation memory 632, and third write the new translation into the index for the previous translation. During these steps, the host processor 602 is taken away from performing other operations. Having the memory controller 610 perform operations such as updating address translations frees the host processor 602 from this task. Because the memory controller 610 determines new address translations, the memory controller 610 is also better suited to conducting operations such as updating the page table.

In some implementations, the memory controller 610 can include a microcontroller 628, a small circuit capable of executing instructions in a manner similar to a processor, but with very limited features and capabilities. For example, the microcontroller 628 may only be able to execute operations specific to accessing and maintaining the storage class memory 612. Maintenance of the storage class memory 612 can include wear leveling operations, such as identifying blocks that are becoming worn out, identifying blocks that are being written to excessively (e.g., more than a threshold amount within a certain period of time), identifying blocks that are underutilized, and/or keeping track of the available, usable space in the storage class memory 612.

The microcontroller 628 could maintain the page table, however, doing so can occupy the microcontroller 628 for long periods of time, during which the microcontroller 628 may be unable to perform maintenance on the storage class memory 612. For example, to find an address translation or a set of address translations, the microcontroller 628 may have to send many read transactions to sequentially read the page table until the desired address translations are found. During this time, read and write transactions to the storage class memory 612 may be stalled due to some issue that could be resolved by the microcontroller 628 if the microcontroller 628 were free to do so.

To avoid tying up the microcontroller 628, in various implementations, the memory controller 610 can thus include a search engine 640. In various implementations, the search engine 640 can locate and, if needed, modify specific entries or sets of entries the page table. In the example of FIG. 6, the search engine 640 includes configuration registers 642 and a state machine 644. The search engine 640 can also include a fabric interface 630 to connect the search engine 640 to the communication fabric 620, though in other examples the fabric interface 630 is external to the search engine 640.

The configuration registers 642 can be used by the communication fabric 620 or the microcontroller 628 to configure a search. For example, one or more registers 642 can be used to specify a search parameter. The search parameter can describe combinations of bits to search for. For example, the search parameter can specify "0xabcd1111" for a memory physical block number, so that the entry containing "0xabcd111" for the memory physical block number is searched for. As another example, the search parameter can specify "1" for a lock indicator, so that all entries having a lock indicator set to "1" are searched for.

The combinations of bits specified by the search parameter can further include less specific descriptions, which may be matched by more than one entry in the page table. For example, the search parameter can specify a range of values for a set of bits, such as "0xabcd0000-0xabce0000" for a memory physical block number. In this example, all entries having a memory physical block number between 0xabcd000 and 0xabce000 are searched for. Also in this example, the configuration registers 642 can include two registers to enable specification of a range. As another example, the search parameter can specify bit positions that can have any value. For example, the search parameter can specify "0xzzzz1234" for the memory physical block number, so that all entries having a memory physical block number with bits [15:0] equal to "0x1234" are searched for, with any value for bits [31:16] being considered matching. In this example, the registers 642 can include a separate register for specifying bits that can have any value. In various implementations, other regular expression-type of descriptions, such as match a pattern of bits zero or one times, match zero or more times, match one or more times, match an exact number of times, match a minimum number of times, match between a minimum and a maximum number of times, can also be used in the search description.

The search description can also combine a specific description, a range description, an any value description, and/or any other descriptions.

In various implementations, the configuration registers 642 can also include registers that can enable the host processor 602 or the microcontroller 628 to specify a range of indexes to search. For example, the configuration registers 642 can include a start index, which indicates the first index in the page table to look at. As a further example, the configuration registers 642 can include a register that specifies a stopping point, which can be specified as an index or a count. In these examples, the search engine 640 will examine only the indexes in the page table that fall between the start index and the stopping point. When no start and stop are specified, the search engine 640 can, by default, search the entire page table.

In some implementations, the configuration registers 642 can also include a register that can specify a virtual machine identifier. In these implementations, the search engine 640 can search for entries storing address translations for addresses in the address range of the virtual machine identified by the identifier. For example, the search engine 640 can, from the virtual machine identifier, determine the machine physical address space assigned to the virtual machine. In this example, the search engine 640 can then use the machine physical address space to determine the machine physical block numbers to look for.

The configuration registers 642 can further include a register that, when written to by the host processor 602 or the microcontroller 628, triggers the search engine 640 to start searching. In some implementations, the configuration registers 642 can also include a register that the communication fabric 620 or the microcontroller 628 can write to, to interrupt a search that is in progress. Writing to this register can, for example, cause the state machine 644 to go to an idle state.

Once the search engine 640 receives a signal to start a search, the search engine 640 can activate the state machine 644. In various implementations, the state machine 644 generates a series of read transactions to the address translation memory 632 to read entries in the page table. The indexes in the page table can correspond to machine physical block numbers (e.g., index 0 is machine physical block number 0x00000000, index 1 is machine physical block number 0x00000001, etc.). In some implementations, the first read transaction in the series starts at index zero (or a start index, if one is specified) and each successive read transaction increments the index by one. In some implementations, the successive read transactions can increment the index by two, five, or some other number, so that every second, fifth, or some other interval of entries is read. In these implementations, the interval can be specified in a configuration register 642. In some implementations, once the first match is found, the state machine 644 can change the interval from a number greater than one to one, so that all entries after the first match are read.

For each entry read from the address translation memory 632, the state machine 644 can determine whether the data read from the entry matches the search description. In some implementations, the state machine 644 can test one bit at a time in the data, where each bit can be tested against a combination of configuration registers 642 that specify the search description. For example, each bit can be tested using an "if-the-else" logic that combines and/or prioritizes different search parameters. In some implementations, parts of the data can be tested against the configuration registers 642 that specify the search description, where the configuration registers 642 may be prioritized (e.g., if an exact match is specified it is tested first, then ranges can be tested, and finally an any value description can be tested).

In some implementations, when the state machine 644 finds that the data from a page table entry matches the search description, the state machine 644 can generate a response to the host processor 602 or the microcontroller 628 (whichever requested the search) to report that a match was found. The response can include, for example, the index of the matching entry. In some implementations, the state machine 644 can stop after finding a first match. For example, the configuration registers 642 can include a register that configures the state machine 644 to stop after the first match. In some implementations, the state machine 644 can continue to read entries from the address translation memory 632 and find additional matching entries. In these implementations, the response to the host processor 602 or the microcontroller 628 can indicate the number of matches that were found and/or a list of indexes where matches were found.

In some implementations, the state machine 644 can modify the contents of matching entries. For example, the configuration registers 642 can include a register in which the host processor 602 or the microcontroller 628 can provide a modification instruction. The modification instructions can specify values and/or bits in the entry to change, and a value to change the value or bits to. For example, the modification instruction can specify to change the machine physical block number stored in an entry to a new machine physical block number. As another example, the modification instruction can specify to change a set of bits in the machine physical block number (e.g., to move the machine physical block number by, for example, 8K pages). In this example, the modification instructions can include a new value for the set of bits or a number by which to increment or decrement the set of bits. As another example, the modification instruction can specify to set or clear a lock indicator, an evictable indicator, or another attribute stored in the entries.

When the state machine 644 has found a matching entry and has a modification instruction, the state machine 644 can generate a write transaction to the address translation memory 632, to write a new value to the entry.

With the search engine 640, the memory controller 610 can thus maintain the page table without assistance from the host processor 602, and without burdening the microcontroller 628. The search engine 640 can execute operations such as updating address translations, updating groups of address translations, clearing lock or evictable indicators, and/or locating a specific translation. By having a dedicated circuit for these operations, the memory controller 610 can operate more efficiently, including reducing latency in accessing the storage class memory 612 and increasing bandwidth to the storage class memory 612.

Figure 7:
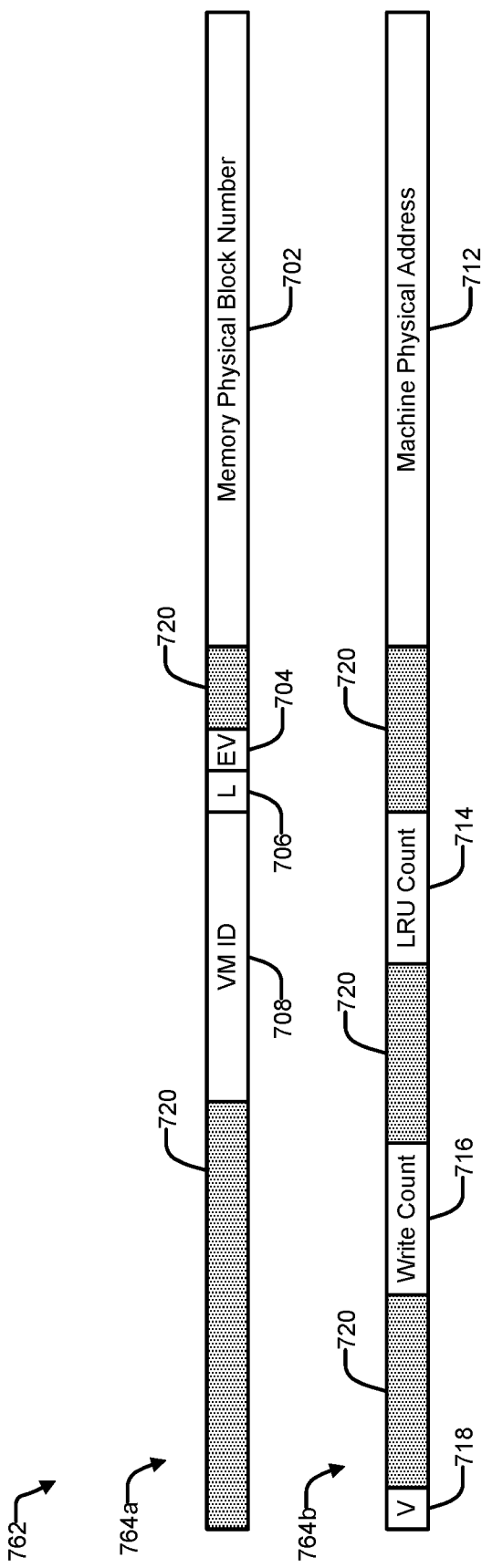
FIG. 7 illustrates an example of a hash table entry, which can be used to store a single address translation.

FIG. 7 illustrates an example of a hash table entry 762, which can be used to store a single address translation. The hash table entry 762 is illustrated as having a first part 764a and a second part 764b, which can be stored in the hash table as a contiguous set of bits or as two separate data words. The first part 764a and the second part 764b can each be, for example, 64 bits long.

In the example illustrated in FIG. 7, the first part 764a of the hash table entry 762 includes a memory physical block number 702, an evictable indicator 704, a lock indicator 706, and a virtual machine identifier 708. In various implementations, the evictable indicator 704, lock indicator 706, and virtual machine identifier 708 can be optional.

The memory physical block number 702 can identify the block in storage class memory. The memory physical block number 702 can be determined by the memory controller (for example by a microcontroller in a memory channel), and the memory controller can change the memory physical block number 702 due to wear leveling activities and/or as parts of the storage class memory become unreliable.

The evictable indicator 704 can indicate that the hash table entry 762 is eligible for eviction. The evictable indicator 704 can indicate that the virtual machine, hypervisor, operating system, or some part of the system's hardware recommends that the translation stored in the hash table entry 762 be evicted first. For example, the virtual machine may have determined that the address translation in the hash table entry 762 is one that the virtual machine expects to use infrequently, and thus favors having this address translation being removed before other, more frequently used address translations are removed. In some implementations, a value for the evictable indicator 704 can be loaded into the hash table entry 762 from the address translation memory. In some implementations, the evictable indicator 704 can be set by the address translation circuit when the virtual machine has identified an entire page (e.g., a memory block) as evictable.

The lock indicator 706 can be used by the virtual machine that is using the hash table entry 762 that the virtual machine would prefer that the translation be kept in the hash table. For example, the translation may be one that the virtual machine anticipates using frequently. In some implementations, the lock indicator 706 can be read from the address translation memory when the translation is loaded. In some implementations, the lock indicator 706 can be set by the address translation circuit when the virtual machine has identified an entire page as locked.

The virtual machine identifier 708 can be used to identify the virtual machine that is using the address translation. The virtual machine identifier 708 can be used, for example, when the address translation circuit is looking for an entry to evict. For example, in some implementations, entries being used by virtual machines that are asleep, idle, or no longer running can be evicted first.

The second part 764b of the hash table entry 762, in this example, includes a machine physical address 712, a least recently used count 714, a write count 716, and a valid indicator 718. In various implementations, the least recently used count 714 and the write count 716 can be optional.

The machine physical address 712 can be used to locate the hash table entry 762 as the desired entry. Specifically, the machine physical address 712 can be compared against an input machine physical address and if a match is found, the hash table entry 762 is the entry that has the desired translation.

The least recently used count 714 can be used to keep track of how recently the translation stored in the hash table entry 762 has been used. For example, when the hash table entry 762 is checked against an input machine physical address and the machine physical address 712 does not match, the least recently used count 714 can be incremented. When the machine physical address 712 does match, the least recently used count 714 can be set to zero. In various implementations, as discussed above, the least recently used count 714 can be used to determine whether to evict the translation stored in the hash table entry 762. For example, in some implementations, the least recently used entry is always evicted first. As another example, the least recently used entry may be evicted only when the lock indicator 706 is not set. As another example, the least recently used entry can be evicted even if the lock indicator 706 is set when no other entries in the row can be evicted. In some examples, when the least recently used count 714 reaches a programmable limit, the hash table entry 762 and the evictable indicator 704 can be automatically set by the address translation circuit.

The write count 716 can be used to track the number of times that the memory physical block number 702 has been written to. The write count 716 is thus incremented only when the transaction for which an address is being translated is a write transaction. In various implementations, the write count 716 can be sent to a statistics log when the translation in the hash table entry 762 is evicted and/or when the write count 716 crosses a programmable threshold (e.g., 64 or some other number).

The valid indicator 718 can be used to determine whether the hash table entry 762 is currently being used, meaning currently storing an address translation. The address translation circuit may sometimes invalidate an entry. For example, the address translation circuit can remove all the entries being used by a particular virtual machine, when the virtual machine becomes idle or is shut down. In various implementations, when the hash table entry 762 is invalidated, the translation stored in the hash table entry 762 can be written to the address translation memory.

In various implementations, the hash table entry 762 can include unused bits 720, inserted into the hash table entry 762 so that each part includes a certain number of bits. For example, addition of the unused bits 720 can increase the number of bits in each part to a power of two or to a particular word size used by the system (e.g., 32, 64, or some other number of bits). In some implementations, other attributes of an address translation can be stored in the unused bits 720. In some implementations, the hash table entry 762 is stored in the hash table without the unused bits 720.

Figure 8:
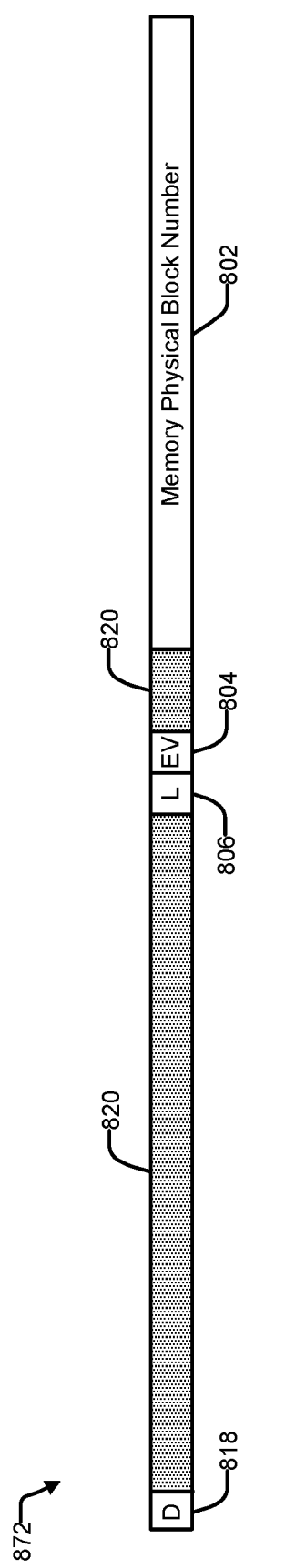
FIG. 8 illustrates an example of a page table entry, which can be used to store an address translation in an address translation memory.

FIG. 8 illustrates an example of a page table entry 872, which can be used to store an address translation in an address translation memory. As discussed above, the page table entry 872 can be found in an address translation memory that stores all of the address translations for a storage class memory. In some implementations, the address translation memory is a direct-mapped, single-level page table, meaning that a machine physical block number can be used to index the page table, and that each entry in the page table can store a corresponding memory physical block number. For example, a page can include 4096 bytes, and the total storage class memory can be 8 TB. In this example, 8 TB can be addressed using 43 address bits, thus bits [43:12] of a machine physical address can be used to index the page table. The page table can include multiple entries organized, for example, according to the example page table entry 872.

In the illustrated example, the page table entry 872 stores a memory physical block number 812, an evictable indicator 804, a lock indicator 806, and a dirty indicator 818. In various implementations, the evictable indicator 804, the lock indicator 806, and the dirty indicator 818 are optional.

The memory physical block number 802 is the location of a memory block in the storage class memory. As discussed above, the page table entry 872 can be found in the address translation memory using a machine physical address. For example, a machine physical block number derived from the machine physical address can be used to read the page table entry 872. The memory physical block number 802 stored in the page table entry 872 and the machine physical block number used to locate the page table entry 872 together provide an address translation for addresses within the page.

The evictable indicator 804 can be used to indicate that, when the translation stored in the page table entry 872 is in the hash table, the entry in the hash table is recommended for eviction. The evictable indicator 804 can have been copied from the hash table when the translation was evicted from the hash table. Alternatively or additionally, the evictable indicator 804 can be written to when, for example, a virtual machine determines that the translation stored in the page table entry 872 is no longer eligible for eviction.

The lock indicator 806 can be used to indicate that, when the translation stored in the page table entry 872 is in the hash table, the translation should remain in the hash table for as long as possible. The lock indicator 806 can be copied from the hash table when the translation is evicted from the hash table. Alternatively or additionally, the lock indicator 806 can be written to when, for example, a virtual machine determines that the translation should be locked or not locked.

The dirty indicator 818 can be used to indicate whether the memory block identified by the memory physical block number 812 has valid data. For example, when a block in the storage class memory that is identified by the memory physical block number 812 has never been written to, the dirty indicator 818 can be not set or set to false. As another example, when a virtual machine is shut down and any storage class memory used by the virtual machine is now available to be used by other virtual machines, the dirty indicator 818 can be cleared or set to false. The dirty indicator 818 can be used, for example, for wear leveling activities. When the block identified by the memory physical block number 812 does not have valid data, the block can be used as a destination for wear leveling. By using a block of memory that does not have valid data, copying of data to a new location is avoided.

In some implementations, the page table entry 872 can include unused bits 820 inserted into the page table entry 872 so that the page table entry 872 includes a certain number of bits. For example, addition of the unused bits 820 can increase the number of bits in the page table entry 872 to a power of two or a particular words size used by the system. In some implementations, other attributes related to the memory physical block number 802 can be stored in the unused bits 820. In some implementations, the page table entry 872 is stored in the address translation memory without the unused bits 820.

Figure 9:
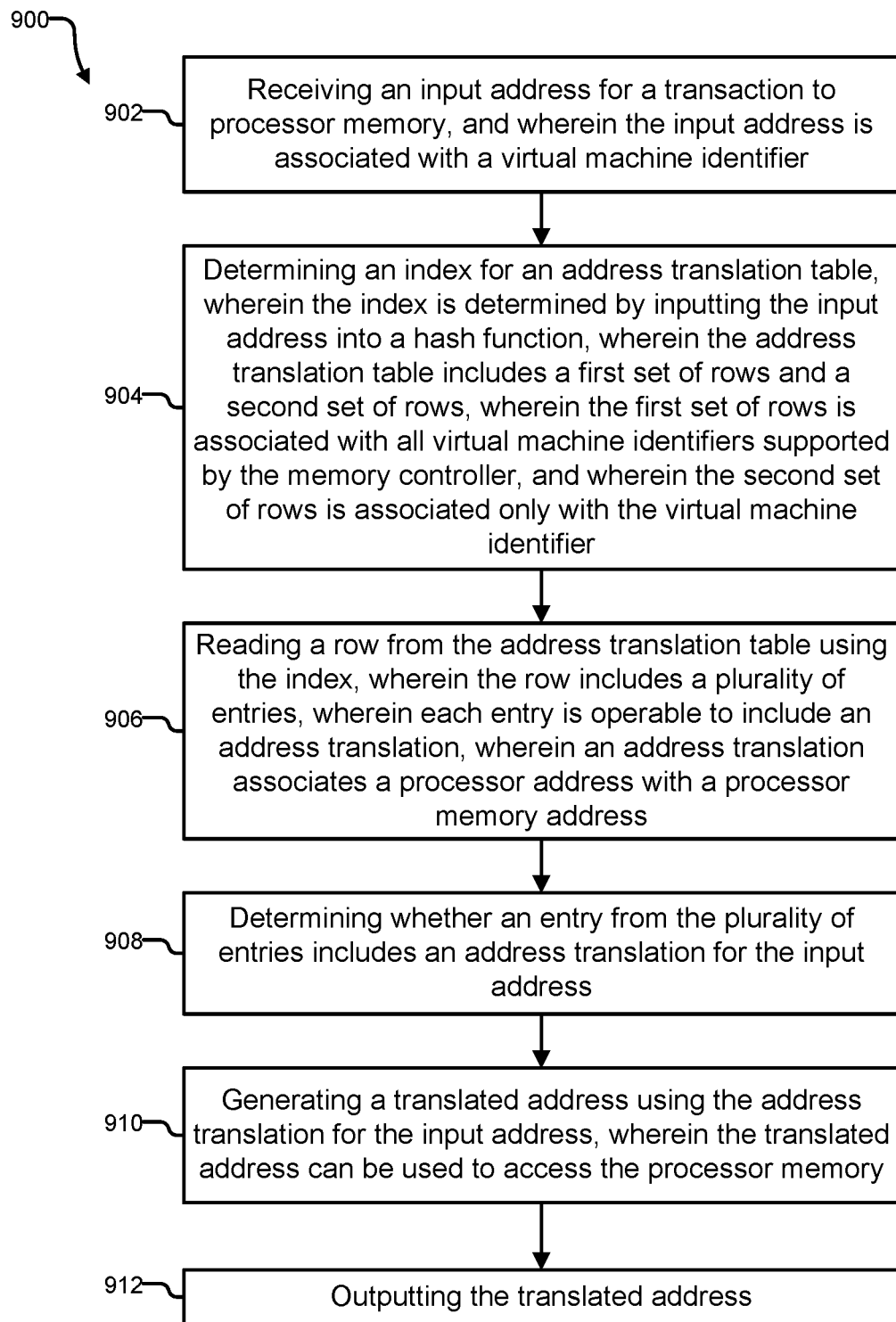
FIG. 9 illustrates an example of a process that can be implemented by an address translation circuit to provide address translations.

FIG. 9 illustrates an example of a process 900 that can be implemented by an address translation circuit to provide address translations. In various implementations, the address translation circuit can be part of a memory controller that manages processor memory for a processor.

At step 902, the process 900 includes receiving an input address for a transaction to processor memory, and wherein the input address is associated with a virtual machine identifier. The processor address, which can also be referred to as a machine physical address, is in the address space of a host processor. The processor memory address, which can also be referred to as a memory physical address, is in the address space of processor memory. In some implementations, the processor memory is storage class memory, which can be logically divided into multiple channels and/or physically divided into multiple ranks. The input address can be part of a read transaction or a write transaction to the processor memory.

At step 904, the process 900 includes determining an index for an address translation table, wherein the index is determined by inputting the input address into a hash function, wherein the address translation table includes a first set of rows and a second of rows, wherein the first set of rows is associated with all virtual machine identifiers supported by the memory controller, and wherein the second set of rows is associated only with the virtual machine identifier. By being associated with all virtual machine identifiers, the virtual machines executing on the system can share the first set of rows. By being associated with only the one virtual machine identifier, on the virtual machine identified by the identifier can use the second set of rows. This configuration, the virtual machine is guaranteed to have rows available in the address translation table. In various implementations, the address translation table is a hash table, and is referred to herein as such.

At step 906, the process 900 includes reading a row from the address translation table using the index, wherein the row includes a plurality of entries, where each entry is configured to include an address translation, wherein an address translation associates a processor address with a processor memory address. In various implementations, an entry can also store attributes for an address translation, such as a lock indicator, an evictable indicator, a least recently used indicator, a write counter, or a virtual machine identifier, among other attributes. An entry can also have a valid indicator, indicating whether the entry is currently storing a valid address translation.

At step 908, the process 900 includes determining whether an entry from the plurality of entries includes an address translation for the input address. When a particular entry from the row includes the address translation for the input address, the processor memory address part of the address translation can be used to translate the input address. When no entry in the row includes the desired address translation, the process 900 can further include reading an address translation from the address translation memory, and storing this address translation in an entry in the row. In this later case, the new address translation can provide a processor memory address to use for the translation.

At step 910, the process 900 includes generating a translated address using the address translation for the input address, wherein the translated address can be used to access the processor memory. As noted above, the address translation for the input address can be found in an entry in the row read from the address translation table, or can be read from the address translation memory.

At step 912, the process 900 includes outputting the translated address. The translated address can be used to access the processor memory, for example by a memory channel that is managing ranks of memory chips.

In some implementations, the row read at step 906 can be from the first set of rows. In these implementations, the process 900 can also include using the virtual machine identifier to identify the second set of rows. The second set of rows can be among multiple sets of rows associated with different virtual machine identifiers. The process 900 can further include reading a second row from the second set of rows using the index. The second row includes a second plurality of entries. The process 900 can further include determining whether an entry from the second plurality of entries includes the address translation for the input address. In some implementations, determining whether an entry from the plurality of entries includes the address translation occurs after determining that no entry in the second plurality of entries includes the address translation.

In some implementations, when the process 900 includes reading a second row, the process 900 can further include determining that each entry in the second row is in use. In this case, when an address translation for the input address is read from the address translation memory, the process 900 can include identifying, for replacement, an entry in the row read using the index. Entries in the shared row can thus be used when no entries in the row that is dedicated to the virtual machine identifier are available.

In some implementations, the process 900 can further include determining that a number of entries in the address translation table that are associated with the virtual machine identifier is at or above a threshold. In these implementations, when an address translation for the input address is read from the address translation memory, a new entry is not provided for the address translation. Either an entry in the row already read must be used, or the process 900 determined to not store the new address translation.

In some implementations, the process 900 can further include receiving an instruction to invalidate one or more entries in the address translation table. In these implementations, the process 900 can include going through each row of the address translation table and invalidating one or more entries. Invalidating can include clearing or setting to zero a valid indicator in an entry. In some implementations, data stored in each of the one or more entries is written to the address translation memory. In some implementations, the one or more entries are being invalidated because the one or more entries are associated with a virtual machine that has become inactive (e.g., the virtual machine may have gone to sleep).

Figure 10:
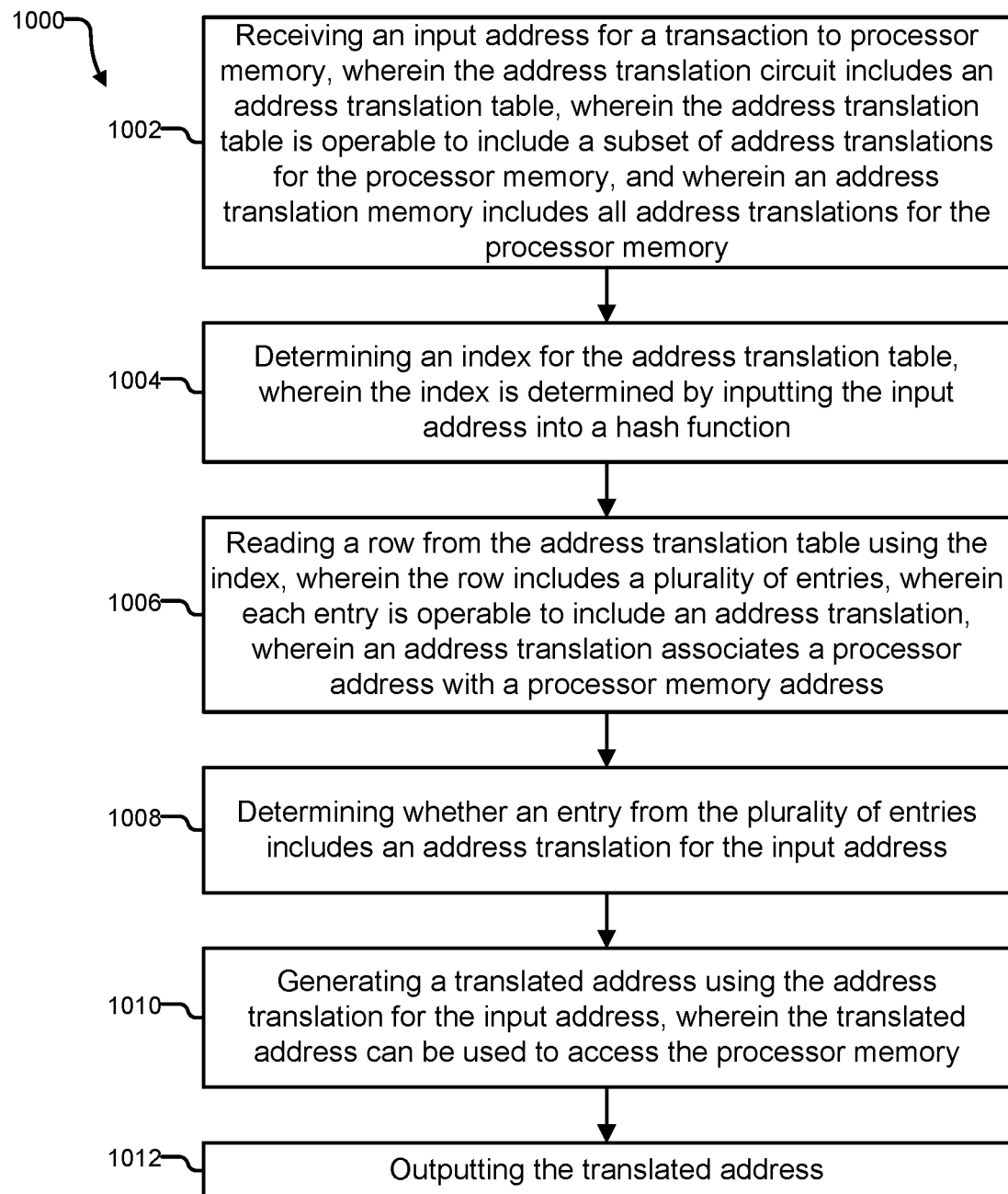
FIG. 10 illustrates an example of a process that can be implemented by an address translation circuit to provide address translations.

FIG. 10 illustrates an example of a process 1000 that can be implemented by an address translation circuit to provide address translations. In various implementations, the address translation can be part of a memory controller that manages processor memory for a processor.

At step 1002, the process 1000 includes receiving an input address for a transaction to processor memory, wherein the address translation circuit includes an address translation table, wherein the address translation table is operable to include a subset of address translations for the processor memory, and wherein an address translation memory includes all address translations for the processor memory. Because the address translation memory includes all address translation for the processor memory, an address translation for any input address is always available, including when the address translation circuit does not itself have the translation.

At step 1004, the process 1000 includes determining an index for the address translation table, wherein the index is determined by inputting the input address into a hash function. The address translation table can include a subset of the address translations stored in the address translation memory.

At step 1006, the process 1000 includes reading a row from the address translation table using the index, wherein the row includes a plurality of entries, where each entry is operable to include an address translation, wherein an address translation associates a processor address with a processor memory address. Each entry may be valid, in which case the entry is storing an address translation that is currently in use. When the entry is not valid, the entry does not include any usable data.

At step 1008, the process 1000 includes determining whether an entry from the plurality of entries includes an address translation for the input address. An entry includes the address translation when a processor address included in the entry matches the input address.

At step 1010, the process 1000 includes generating a translated address using the address translation for the input address, wherein the translated address can be used to access the processor memory. The address translation for the input address can include a particular processor memory address, which can be used to generate the translated address.

At step 1012, the process 1000 includes outputting the translated address. The translated address can be used to access the processor memory.

In some implementations, the process 1000 further includes receiving an update for a particular address translation stored in the address translation table. The update can modify a prior processor memory address for the particular address translation to a new processor memory address. The update may be reflecting migration of a data block associated with the prior processor memory address to the new processor memory address. In some implementations, an entry in the address translation memory, which includes the particular address translation, is also updated when the address translation table is updated. In some implementations, the entry in the address translation memory is updated when the particular address translation is removed from the address translation table.

Figure 11:
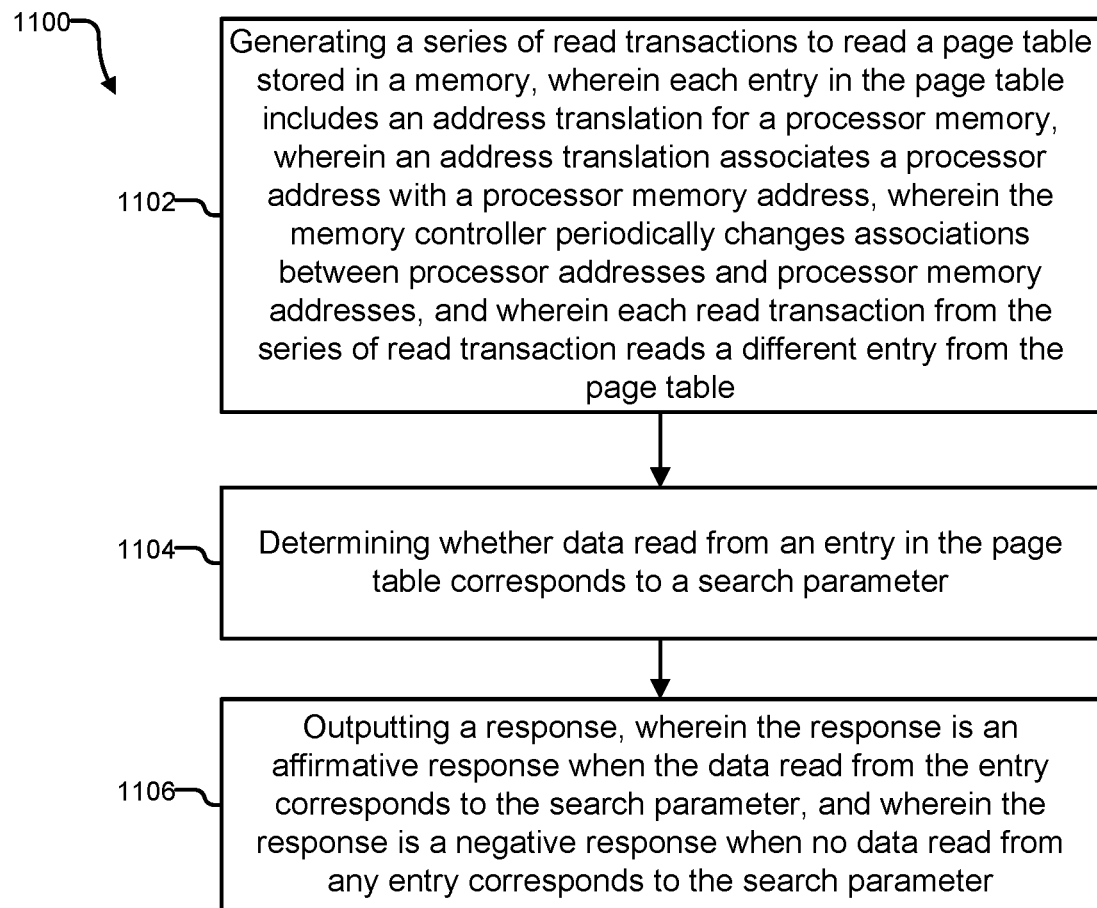
FIG. 11 illustrates an example of a process that can be executed by a search engine circuit of a memory controller.

FIG. 11 illustrates an example of a process 1100 that can be executed by a search engine circuit of a memory controller. At step 1102, the process 1100 includes generating a series of read transactions to read a page table stored in a memory, wherein each entry in the page table includes an address translation for a processor memory, wherein an address translation associates a processor address with a processor memory address, wherein the memory controller periodically changes associations between processor addresses and processor memory addresses, and wherein each read transaction from the series of read transaction reads a different entry from the page table. The entries being read can be sequential.

At step 1104, the process 1100 includes determining whether data read from an entry in the page table corresponds to a search parameter. In various implementations, the process 1100 can make this determination for each entry that is read from the page table. In some implementations, the search parameter includes a sequence of bits. In these implementations, the data read from an entry in the page table corresponds to the search parameter when the data includes a same sequence of bits. In some implementations, the search parameter includes a description of matching bits, such as a pattern to be matched, a range of possible matching values, and/or bits that can have any value. In these implementations, the data read from an entry in the page table corresponds to the search parameter when the data includes bits that fall within the description.

At step 1106, the process 1100 includes outputting a response, wherein the response is an affirmative response when the data read from the entry corresponds to the search parameter, and wherein the response is a negative response when no data read from any entry corresponds to the search parameter. In various implementations, the response can include the number of matching entries found and/or the indexes at which the matching entries were found.

In some implementations, the process 1100 further includes continuing the series of read transactions when data read from an entry in the page table corresponds to the search parameter. In these implementations, the process 1100 can find multiple matching entries. In some implementations, when more than one entry includes data that corresponds to the search parameter, the response can indicates that more than one entry corresponds to the search parameter.

In some implementations, the process 1100 further includes generating a write transaction to write the entry that corresponds to the search parameter. The write transaction can modify data stored in the page table for the entry.

Figure 12:
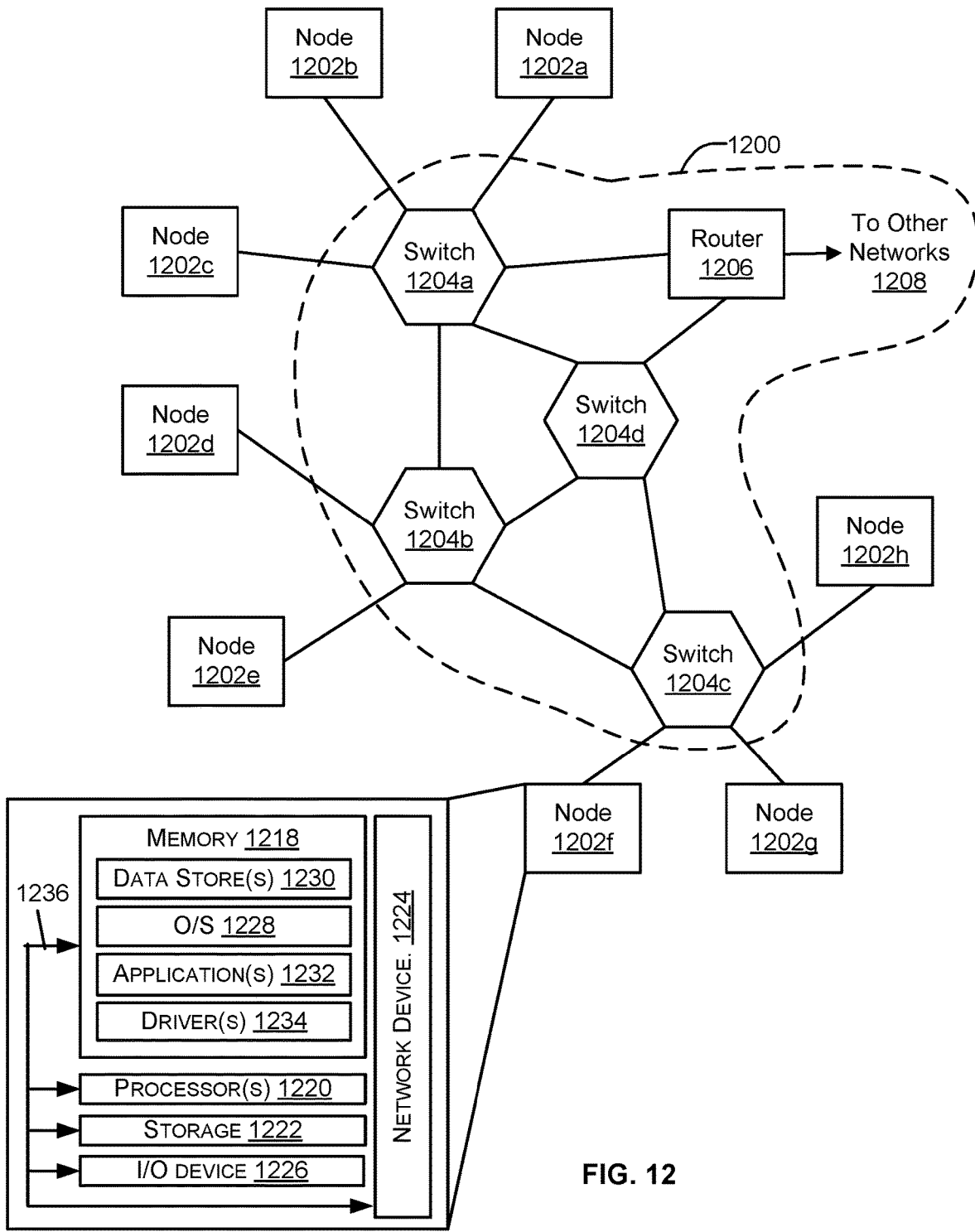
FIG. 12 illustrates an example architecture for features and systems described herein that includes one or more service provider computers and/or a user device connected via one or more networks, according to certain aspects of the disclosure.

FIG. 12 illustrates a network 1200, illustrating various different types of network devices, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). In some examples, the memory 1218 can include storage class memory. The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, a bus interface module may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An address translation circuit for a memory controller, comprising:

an address translation table, wherein the address translation table is operable to include a subset of address translations for a processor memory, wherein an address translation memory coupled to the address translation circuit includes all address translations for the processor memory, and wherein the memory controller periodically changes associations between processor addresses and processor memory addresses;

wherein the address translation circuit is operable to:

receive an input address associated with a write transaction to the processor memory;

determine an index for the address translation table, wherein the index is determined by inputting the input address into a hash function;

read a row from the address translation table using the index, wherein the row includes a plurality of entries, wherein each entry is operable to include an address translation that associates a processor address with a processor memory address;

identify a matching entry from the plurality of entries that includes an address translation for the input address, wherein the matching entry includes the address translation for the input address when at least a portion of a processor address stored in the matching entry matches a corresponding portion of the input address;

in response to identifying the matching entry, set a write counter stored in the matching entry to a particular value and increment each remaining write counter stored in the plurality of entries, the write counter corresponding to a number of writes to a memory physical block;

generate a translated address using the address translation, wherein the address translation provides a processor memory address that corresponds to the input address, wherein the translated address is formed using the processor memory address, and wherein the translated address corresponds to a physical address in the processor memory; and
output the translated address.

2. The address translation circuit of claim 1, wherein an address translation in an entry in the address translation table includes a machine block number and a corresponding memory block number, wherein the machine block number identifies a block of processor addresses, and wherein the memory block number identifies a block of processor memory addresses.

3. The address translation circuit of claim 1, wherein an address translation in an entry in the address translation memory includes a memory block number identifying a block of processor memory addresses, and wherein the entry is indexed using machine block number corresponding to the memory block number.

4. The address translation circuit of claim 1, wherein the address translation memory is populated by the memory controller during boot-up of the memory controller.

5. An address translation circuit for a memory controller, comprising:
an address translation table, wherein the address translation table is operable to include a subset of address translations for a processor memory, and wherein an address translation memory includes all address translations for the processor memory;
wherein the address translation circuit is operable to:
receive an input address associated with a write transaction to the processor memory;
determine an index for the address translation table, wherein the index is determined by inputting the input address into a hash function;
read a row from the address translation table using the index, wherein the row includes a plurality of entries, wherein each entry is operable to include an address translation that associates a processor address with a processor memory address;
identify a matching entry from the plurality of entries that includes an address translation for the input address;
in response to identifying the matching entry, set a write counter stored in the matching entry to a particular value and increment each remaining write counter stored in the plurality of entries, the write counter corresponding to a number of writes to a memory physical block;
generate a translated address using the address translation for the input address, wherein the translated address corresponds to a physical address in the processor memory; and
output the translated address.

6. The address translation circuit of claim 5, further operable to:
determine that a particular entry from the plurality of entries includes the address translation for the input address.

7. The address translation circuit of claim 5, further operable to:
determine that no entry from the plurality of entries includes the address translation for the input address;
read, using the input address, an entry from the address translation memory; and
update an entry from the plurality of entries to include the address translation for the input address.

8. The address translation circuit of claim 5, further operable to:

determine that no entry from the plurality of entries includes the address translation for the input address;
identify a particular entry from the plurality of entries to use to store the address translation for the input address; and
store the address translation for the input address, wherein storing the address translation for the input address includes writing the input address and a processor memory address associated with the input address to the particular entry.

9. The address translation circuit of claim 8, wherein identifying the particular entry includes determining that the particular entry is designated as evictable, wherein an entry designated as evictable is considered for removal before an entry that is not designated as evictable.

10. The address translation circuit of claim 8, wherein identifying the particular entry includes:
determining that the particular entry is designated as evictable; and
determining that more than one entry from the plurality of entries are designated as evictable, wherein the particular entry is identified for removal based on the particular entry being least recently used among the more than one entries.

11. The address translation circuit of claim 8, wherein identifying the particular entry includes determining that the particular entry is designated as evictable and is not designated as locked.

12. The address translation circuit of claim 8, wherein identifying the particular entry includes determining that all entries from the plurality of entries are designated as locked, wherein the particular entry is identified for removal based on the particular entry being least recently used from among the plurality of entries.

13. The address translation circuit of claim 8, wherein data from the particular entry is written to the address translation memory.

14. The address translation circuit of claim 13, wherein the data includes a lock indicator.

15. The address translation circuit of claim 13, wherein the data includes an evictable indicator.

16. The address translation circuit of claim 5, wherein the processor memory includes storage class memory.

17. A computer-implemented method, comprising:
receiving, by an address translation circuit of a memory controller, an input address associated with a write transaction to processor memory, wherein the address translation circuit includes an address translation table, wherein the address translation table is operable to include a subset of address translations for the processor memory, and wherein an address translation memory includes all address translations for the processor memory;
determining an index for the address translation table, wherein the index is determined by inputting the input address into a hash function;
reading a row from the address translation table using the index, wherein the row includes a plurality of entries, where each entry is operable to include an address translation that associates a processor address with a processor memory address;
identifying a matching entry from the plurality of entries that includes an address translation for the input address;
in response to identifying the matching entry, setting a write counter stored in the matching entry to a particular value and incrementing each remaining write counter stored in the plurality of entries, the write counter corresponding to a number of writes to a memory physical block;

generating a translated address using the address translation for the input address, wherein the translated address corresponds to a physical address in the processor memory; and outputting the translated address.

18. The computer-implemented method of claim 17, wherein the entry from the plurality of entries includes the address translation for the input address when a processor address included in the entry matches the input address.

19. The computer-implemented method of claim 17, wherein the address translation for the input address includes a particular processor memory address, and wherein generating the translated address includes using the particular processor memory address.

20. The computer-implemented method of claim 17, further comprising:

receiving an update for a particular address translation stored in the address translation table, wherein the update modifies a prior processor memory address for the particular address translation to a new processor memory address, wherein the update reflects migration of a data block associated with the prior processor memory address to the new processor memory address.

21. The computer-implemented method of claim 20, further comprising:

updating an entry in the address translation memory when the address translation table is updated, wherein the entry includes the particular address translation.

22. The computer-implemented method of claim 20, further comprising:

updating an entry in the address translation memory when the particular address translation is removed from the address translation table.

* * * * *